United States Patent
Vaninger et al.

(10) Patent No.: US 8,783,326 B1
(45) Date of Patent: *Jul. 22, 2014

(54) TIRE CHANGING MACHINE WITH AUTOMATED TIRE BEAD PRESSING DEVICES, CONTROLS AND METHODS

(75) Inventors: Micah Nathan Vaninger, St. Louis, MO (US); Joel Clasquin, Highland, IL (US)

(73) Assignee: Hunter Engineering Company, St. Louis, MO (US)

( * ) Notice: Subject to any disclaimer, the term of this patent is extended or adjusted under 35 U.S.C. 154(b) by 246 days.

This patent is subject to a terminal disclaimer.

(21) Appl. No.: 13/446,401

(22) Filed: Apr. 13, 2012

Related U.S. Application Data

(63) Continuation-in-part of application No. 12/877,430, filed on Sep. 8, 2010, now Pat. No. 8,387,675.

(60) Provisional application No. 61/488,367, filed on May 20, 2011, provisional application No. 61/240,771, filed on Sep. 9, 2009, provisional application No. 61/308,602, filed on Feb. 26, 2010.

(51) Int. Cl.
*B60C 25/138* (2006.01)

(52) U.S. Cl.
CPC .................................. *B60C 25/138* (2013.01)
USPC ........................................ 157/1.24; 157/1.17

(58) Field of Classification Search
CPC B60C 25/05; B60C 25/0551; B60C 25/0572; B60C 25/132; B60C 25/135; B60C 25/138
USPC ............................ 157/1, 1.1, 1.17, 1.22, 1.24
See application file for complete search history.

(56) References Cited

U.S. PATENT DOCUMENTS

| | | | |
|---|---|---|---|
| 6,056,034 A | 5/2000 | Matnick | |
| 6,182,736 B1 | 2/2001 | Cunningham et al. | |
| 6,276,422 B1 | 8/2001 | Rino | |
| 7,188,656 B2 * | 3/2007 | Gonzaga | 157/1.17 |
| 7,438,109 B2 | 10/2008 | Cunningham | |
| 7,481,258 B2 | 1/2009 | Vignoli | |
| 7,495,755 B2 * | 2/2009 | Voeller et al. | 356/139.09 |
| 7,738,120 B2 * | 6/2010 | Braghiroli | 356/635 |
| 8,250,915 B1 * | 8/2012 | Voeller et al. | 73/460 |
| 8,276,641 B2 * | 10/2012 | Matteucci | 157/1.24 |
| 8,284,390 B1 * | 10/2012 | Clasquin et al. | 356/139.09 |
| 8,342,222 B2 * | 1/2013 | Braghiroli et al. | 157/1.1 |
| 8,342,223 B2 * | 1/2013 | Sotgiu | 157/1.28 |
| 8,387,675 B1 * | 3/2013 | Vaninger et al. | 157/1.24 |
| 8,537,347 B1 * | 9/2013 | Clasquin et al. | 356/139.09 |
| 8,613,303 B1 * | 12/2013 | Hanneken et al. | 157/1.17 |
| 2008/0123107 A1 * | 5/2008 | Sotgiu | 356/601 |

FOREIGN PATENT DOCUMENTS

| | | | |
|---|---|---|---|
| EP | 0659597 A1 | 6/1995 | |
| EP | 0659597 B1 | 10/1997 | |
| EP | 1897710 A1 | 3/2008 | |
| EP | 1897710 B1 | 3/2009 | |

\* cited by examiner

*Primary Examiner* — David B Thomas
(74) *Attorney, Agent, or Firm* — Armstrong Teasdale LLP

(57) ABSTRACT

Tire changing machines with automated positioning and closed loop control of bead pressing devices are described to maintain and control operation of the bead pressing devices during tire mount and de-mount procedures. Methodology is also disclosed.

24 Claims, 24 Drawing Sheets

TIRE CHANGING MACHINE WITH AUTOMATED TIRE BEAD PRESSING DEVICES, CONTROLS AND METHODS

CROSS REFERENCE TO RELATED APPLICATIONS

This application claims the benefit of U.S. Provisional Patent Application Ser. No. 61/488,367 filed May 20, 2011, the complete disclosure of which is hereby incorporated by reference in its entirety.

This application is also a continuation-in-part application of U.S. patent application Ser. No. 12/877,430 filed Sep. 8, 2010 and now issued U.S. Pat. No. 8,387,675 which claims the benefit of U.S. Provisional Patent Application Ser. No. 61/240,771 filed Sep. 9, 2009 and U.S. Provisional Patent Application Ser. No. 61/308,602 filed Feb. 26, 2010, the complete disclosures of which are hereby incorporated by reference in their entirety.

BACKGROUND OF THE INVENTION

The field of the invention relates generally to machines for changing a tire on a wheel rim, and more specifically to tire changing machines having bead pressing devices.

The process of removing a tire from a wheel rim and replacing it with another tire, referred to herein as tire changing, can be difficult. In response to such difficulties, machines have been developed to facilitate the tire changing process. The machines commonly include a clamping mechanism and a drive assembly that spins the wheel rim about an axis. A bead breaker tool exerts pressure on the tire adjacent the wheel rim to break the tire bead seal, and a tire removal tool, which may be either manually inserted by a machine operator or integrated into the machine itself, is used to pull the bead of the tire off the wheel rim as the wheel rim is rotated, allowing the tire to be separated from the rim for removal. Manual or machine implemented tools are also utilized to press the tire onto the wheel rim for installation. While known machines have obtained some level of success in reducing the time and labor associated with changing a tire, there remains room for improvement.

BRIEF DESCRIPTION OF THE INVENTION

Advantageous embodiments of machines for changing tires on a wheel rim, and control systems and methods for tire changing machines are disclosed that provide numerous benefits and improvements over existing tire changing machines. The exemplary tire changing machines and methods facilitate efficient tire changing with reduced difficulty for machine operators and with improved control features and convenience.

In one embodiment, a tire changing machine includes a plurality of bead pressing devices each having a common rotational axis that is fixed and coincident with the drive axis of the machine in a tire change procedure. Compared to known swing-arm style mounts of pressing tools, a more compact arrangement of tools is provided that is more amenable to automated positioning of the bead pressing devices. Specifically, a controller and feedback sensors may be provided to detect and position one or more of the plurality of bead pressing devices in directions parallel to and perpendicular to the drive axis. Deflection of machine components in use may also be detected and compensated for to more accurately position the bead pressing devices and to more effectively control the machine.

The bead pressing devices, in addition to being automatically and optimally positioned in a direction perpendicular to the drive axis of the machine and in a direction parallel to the drive axis of the machine, may also be automatically positioned at distinct angular positions on the tire for optimal mounting and de-mounting of tires. To ensure optimal bead pressing force at appropriate locations on the tire, respective ones of the bead pressing devices may be maintained in fixed position for a portion of a tire mount mode as the tire is rotated, while other of the pressing devices are free to follow the tire as it is rotated. Additionally, a traction point between the tire and wheel rim may be established with a bead pressing device by positively driving one of the bead pressing devices in a rotational direction as the wheel rim begins to rotate about the drive axis. When predetermined amounts of rotation have occurred, the fixed position pressing devices are also released to follow the rotating tire. Still further, the position of the bead pressing devices in a direction parallel to the drive axis may be adjusted as a function of the angular position of the device as the tire and rim are rotated.

A rotational position sensor may also be provided and may provide a feedback signal corresponding to a position of at least one of the bead pressing devices to a machine controller for various purposes, including but not limited to operation of a traction point drive mechanism associated with the bead pressing devices. The controller may adjust operation of different machine components in response to a detected position of the bead pressing device. Different types of corrective action in response to detected conditions of the bead pressing tool are possible.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Figure 1A:
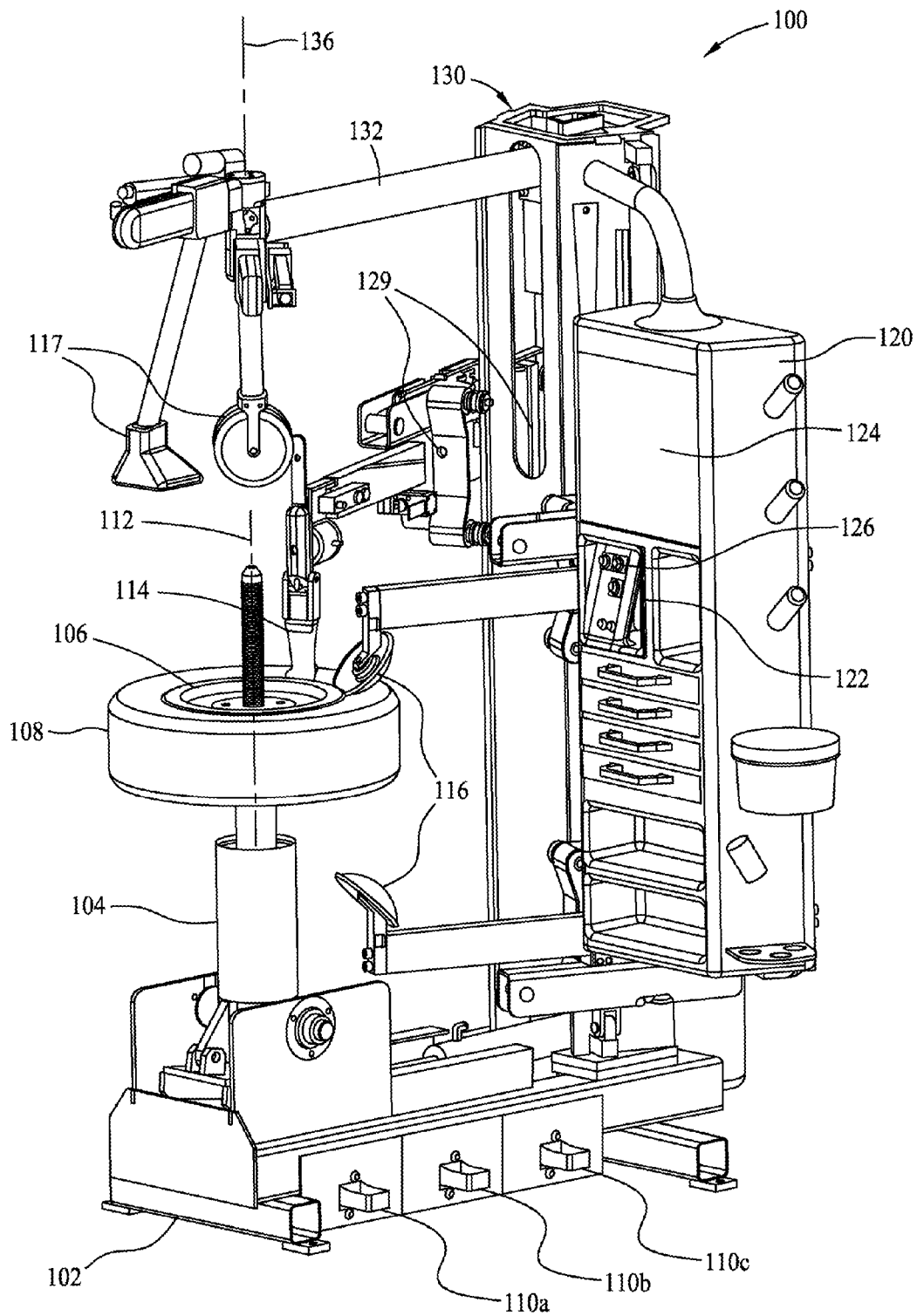
FIGS. 1a, 1b and 1c are respective views of an exemplary embodiment of a tire changing machine in a perspective view, a magnified view, and a sectional view.

In recent times a great variety of sizes in wheel rims and tires are being utilized as both original equipment and after market accessories for vehicles. Accommodating the wide variety of wheel rims and tire sizes with existing tire changing machines is difficult. Conventionally, machines have been designed predominately for so-called "standard" tire and rim sizes, and also for "standard" tire types. When used with the types of wheel rims and tire types for which the machines were designed, they may work quite well. However, it is common nowadays for many vehicle repair shops or retail tire dealers to routinely encounter tires and rims that deviate, sometimes greatly, from the standard sizes and tire types for which conventional machines have been designed. Additionally, run flat tires and the like having a much stiffer construction are now available and in common use on many types of vehicles. The combination of larger wheel and rim sizes, and stiffer tire construction, can be particularly problematic in many existing machines.

When mounting a tire for example, the tire bead must be pressed over a flange of the wheel rim into a drop center portion of the rim. A tire mounting tool, commonly provided in existing tire changing machines, may assist in locating the bead in the drop center of the rim. Typically, at a location spaced from the tire mounting tool on the circumference of the tire, a downward pressure is also applied, and as the rim is rotated about an axis of rotation, the tire bead is gradually positioned in the drop center of the rim. The downward pressure helps guide the tire onto the rim and also ensures that the tire will not flex in a manner that will cause the tire bead to separate from the rim. Similar pressure is likewise helpful in tire de-mounting procedures to successfully remove the tire bead from the rim.

For certain tire sizes, and for tires that are not particularly stiff, the pressing of the tire into the drop center of the rim may be accomplished by hand, with or without assistance of a handheld tool. For larger and/or stiffer tires, however, the force required to press the tire bead into the drop center of the rim easily exceeds what the typical person can apply by hand. Bead pressing devices, sometimes referred to as "pusher" devices, are therefore sometimes integrated in a structure of a tire changing machine. The pusher devices push or press on the tire sidewall as tires are mounted or demounted, and are capable of exerting sufficient force to properly mount or de-mount a given tire. Such pusher devices may typically generate much greater amounts of force than can be applied by hand and have achieved some success in allowing a greater variety of tires to be changed on existing tire changing machines. However, known pusher devices of existing tire changing machines can be difficult to use in some instances for at least several reasons.

For example, existing pusher devices that have been integrated into the structure of known tire changing machines are typically manually adjustable in position by a machine operator, and it can sometimes be a trial and error process for the machine operator to determine a proper position of the pusher device. For successful mounting and de-mounting of a tire, the bead pressing device generally should be located at the proper radial distance from the rotational axis of the machine, the pressing device should be located at the proper depth relative to the rim to ensure positioning of the tire bead in the rim drop center, and the pressing device should be located at an appropriate angular distance from the mounting or de-mounting tool on the circumference of the tire side wall. Because of the difficulty in successfully doing this as an initial matter, the machine operator often has to make repeated attempts to position the bead pressing device correctly for mounting or de-mounting of a tire. Such attempts can be further complicated when multiple pressing devices are provided, or when, because of the manner in which the pressing tools are provided in the machine, the location of the pressing tool(s) obscures a clear view of the mounting or demounting tool. These and other difficulties undesirably increase an average length of time needed to change a tire and perhaps more significantly may result in inadvertent damage to the wheel rim or tire, damage to the machine itself, and/or potentially hazardous operating conditions during tire changing processes.

Secondly, the geometry of the bead pressing devices relative to the mounting or demounting tools of the machine can present difficulties for certain types of tires and sizes of tires. That is, even for machines provided with bead pressing devices, their adjustable range may not be sufficient to mount certain sizes of tires or certain types of tires. Limitations in positioning of the bead pressing devices relative to tire mount and de-mount tools may impede successful mounting or de-mounting of a tire. Especially for larger tires, the ability to sufficiently space the tire bead pressing devices from the tire mount or demount tool, and/or locating a bead pressing device to prevent the tire bead from moving out of the drop center of the rim as it is rotated about the machine rotational axis, may not be possible. In such cases, spacing clips or other tools are sometimes utilized by a machine operator to maintain a portion of the tire bead in the drop center as the wheel rim is rotated about the rotational axis of the machine. Installation and removal of such clips also tends to undesirably increase an average amount of time to change a tire, and is another accessory to be maintained and stored.

Thirdly, the outer circumference and/or the width of some rims and tires may extend to and beyond the capabilities of many known machines, making it difficult, if not impossible, to change tires on certain sizes of rims with existing machines.

Fourth, existing bead pressing devices often require a machine operator to exert manual force to the bead pressing device in a direction of the rim rotation in order to create a so-called "traction point" between the tire and rim. Without this traction point it is possible that the rim may rotate about the drive axis of the machine while the tire does not. That is, unless such a traction point is established, the tire and the bead pressing device may remain in a stationary position with the tire slipping against the wheel rim.

Exemplary embodiments of tire changing machines and methods are described in detail below. The tire changing machines and methods facilitate efficient tire changing with reduced difficulty for machine operators and with improved control features. Specifically, bead pressing devices may be automatically and optimally positioned in a direction perpendicular to the drive axis of the machine, in a direction parallel to the drive axis of the machine, and at distinct angular positions on the tire for mounting and de-mounting of tires. The leading pusher device may be driven in the direction of rim rotation to establish a traction point between the tire and rim. Respective ones of the bead pressing devices are maintained in fixed position for a portion of a tire mount mode while other of the pressing devices are free to follow the tire as it is rotated, and while still others may exert rotational force on the tire to create a traction point between the tire and the wheel rim. That is, one or more of the pressing devices may be driven in the direction of rim rotation to ensure that the tire continues to be rotated with the rim. When predetermined amounts of rotation have occurred, the fixed position pressing devices are also released to follow the rotating tire. Still further, the position of the bead pressing devices in a direction parallel to the drive axis may be adjusted as a function of the angular position of the device as the tire and rim are rotated. Control systems including feedback sensors concerning position of the pressing devices, and also deflection of machine components in use, facilitate and ensure accurate and automatic positioning of the bead pressing devices.

Figure 1B:
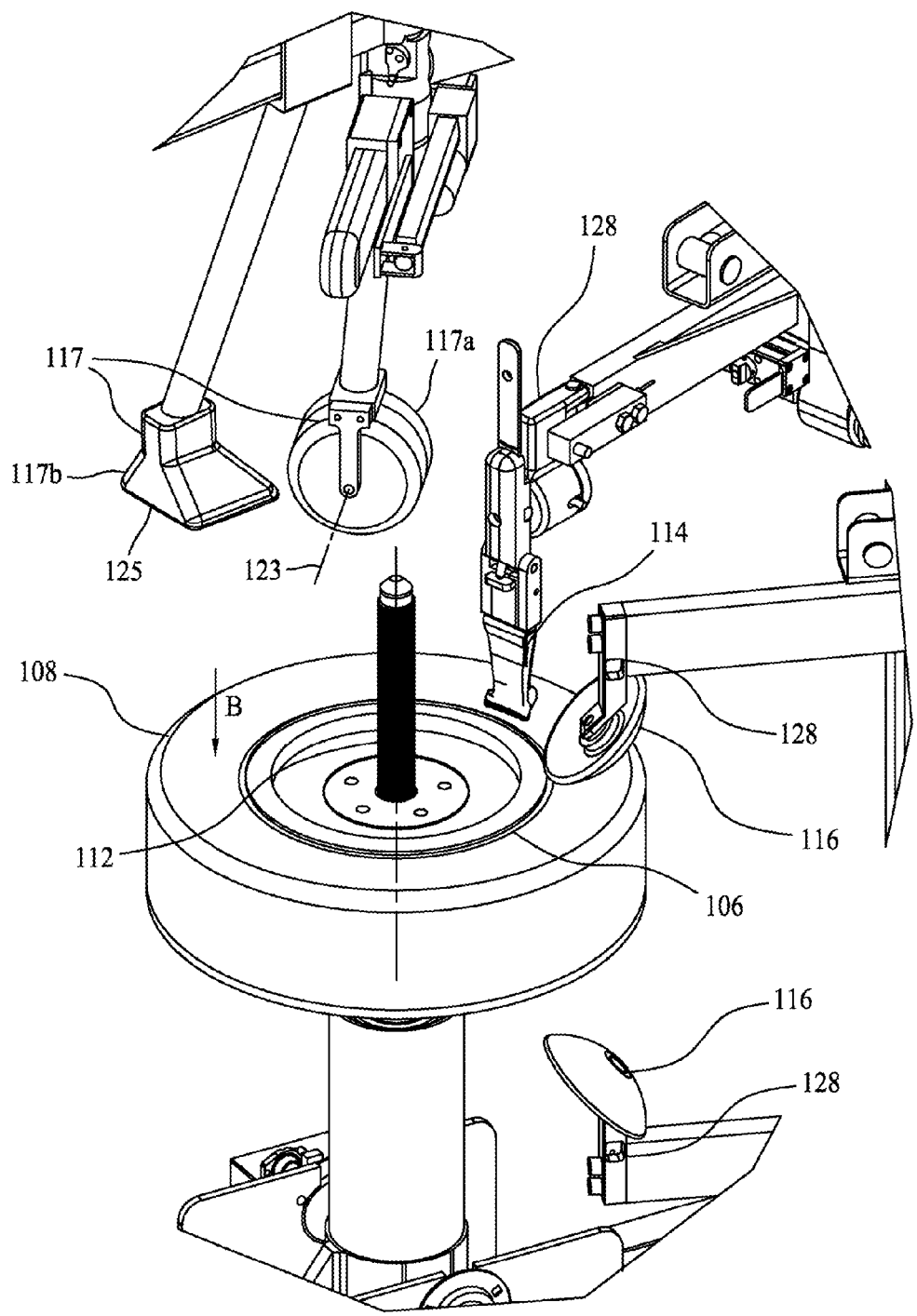
Figure 1C:
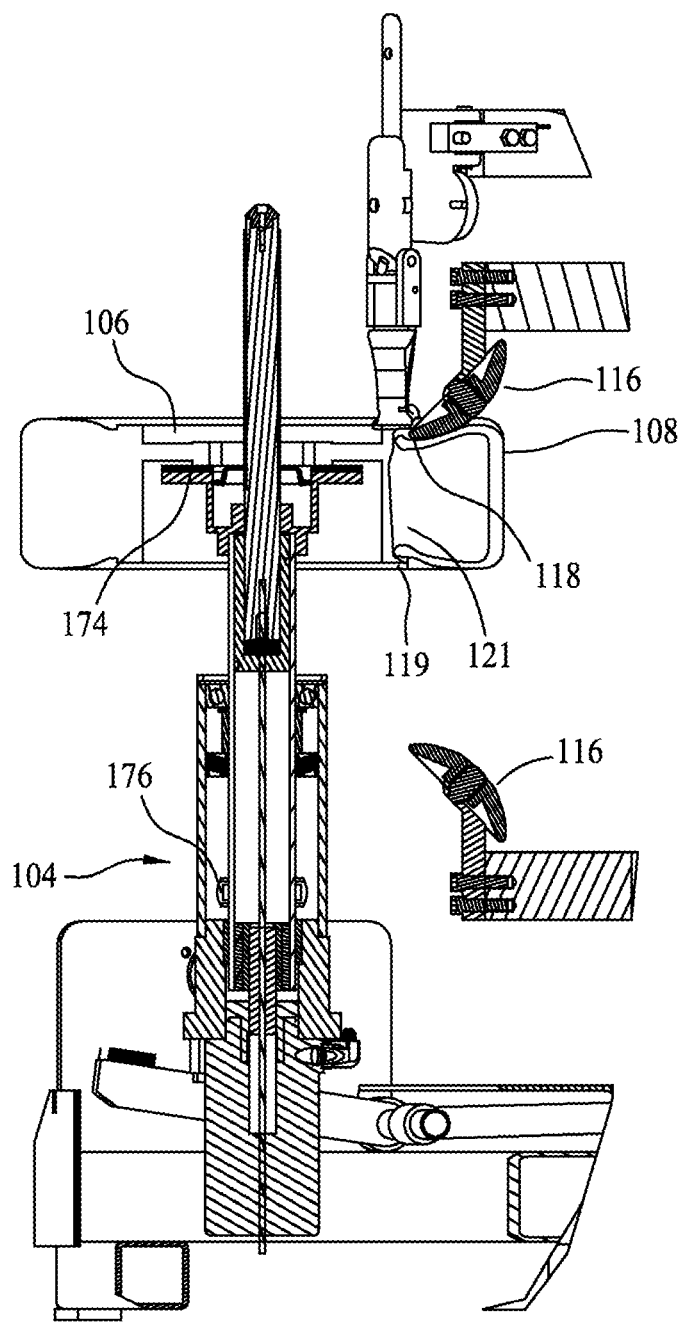

FIGS. 1a, 1b and 1c illustrate an exemplary tire changing machine 100 including a frame or base 102 and a rotatable drive shaft assembly 104 attached to the base 102. The drive shaft assembly 104 may include a post or shaft positioned centrally on the base 102, and the shaft is adapted to receive and retain a wheel rim 106 having a tire 108. The wheel rim 106 may be secured to the drive shaft assembly 104 with a clamping mechanism after the wheel rim 106 and tire 108 is loaded and mounted onto the machine 100. In an exemplary embodiment, the clamping mechanism may be as described in the commonly owned U.S. patent application Ser. No. 12/358,760 filed Jan. 23, 2009, the disclosure of which is hereby incorporated by reference in its entirety. In other embodiments, alternative clamping mechanisms known in the art may be utilized.

After the wheel rim 106 is clamped in position, a machine operator manipulates an input selector 110a which operates the drive shaft assembly 104 to rotate the wheel rim 106 and tire 108 about a drive axis 112 (FIG. 1b). In different exemplary embodiments, the drive shaft assembly 104 may be pneumatically or hydraulically actuated or powered electrically. In another embodiment, a rotating turntable or other mechanism may be provided in lieu of the drive shaft assembly 104.

While the drive axis 112 is illustrated as being generally vertical in the embodiment depicted, the axis 112 may be oriented horizontally or otherwise in other embodiments, and the axis 112 may be selectively positionable in different positions relative to the base 102.

As the wheel rim 106 is rotated about the axis 112, one or more tire changing tools 114, 116 and 117 may be brought into physical contact or engagement with the tire 108 in the direction of arrow B (FIG. 1b) at respective locations proximate an outer periphery of the rim 106. With the tools 114, 116 and 117 in the proper position with respect to the tire 108 and wheel rim 106, the tire 108 and wheel rim 106 are rotated about the axis 112 with the tools 114, 116 and 117 engaged to the tire 108 to install or remove the tire. Also, an automated force may optionally be applied to the tool 117, as explained further below, in order to create a traction point between the wheel rim 106 and the tire 108 by pushing the tool 117 (and hence the tire 108 also) in the direction of rotation of the rim 106.

The tool 114 is sometimes referred to as a tire mount or demount tool. The tool 114 may include a wedge that is extended into an area between the wheel rim 106 and the tire 108 to separate or displace an inner circumference of the tire 108 including the bead 118 (FIG. 1c) over the outer lip 119 (FIG. 1c) of the wheel rim 106 to remove the tire 108, or to engage the inner circumference of the tire 108 including the bead 118 on the outer lip 119 of the wheel rim 106 to install the tire 108. The tire 108 may be appropriately lubricated to facilitate easier removal and installation using the tool 114.

The tools 116 are sometimes referred to as bead breaker tools that exert pressure on the tire 108 to either break the tire bead seal 118 with the rim 106 or push or displace the inner circumference of the tire 108 over the outer lip of the wheel rim 106 to install the tire 108. As shown in the exemplary embodiment in FIGS. 1a and 1b, two tools 116 are shown, one located above the tire 108 and the other located below the tire 108. In another embodiment, a single bead breaker tool 116 could be provided.

The tools 117 are sometimes referred to as pressing tools, pusher tools, or bead pressing devices. As shown in the exemplary embodiment in FIGS. 1a and 1b, bead pressing devices 117 are shown that exert pressure on the tire sidewall in tire mounting and de-mounting procedures. In the exemplary embodiment differently configured bead pressing devices 117a and 117b are shown.

The bead pressing device 117a, is a roller device that is mounted for rotation about an axis 123 that is substantially perpendicular to the machine drive axis 112. Thus, when the roller device 117a is placed in contact with the tire sidewall, it may rotate about the axis 123 as the tire is rotated about the machine drive axis 112 while the device 117a remains in a fixed position relative to the machine drive axis 112. When desired, the roller device 117a is also operable wherein it may rotate in tandem with the tire 108 about the drive axis 112.

The bead pressing device 117b is adapted for stationary contact with the tire 108 and includes a frictional engagement surface 125. When engaged to the tire sidewall, the pressing device 117b rotates about the drive axis 112 with the tire 108. Optionally the pressing device 117b may incorporate a feature that engages a spoke, a hole, or other feature of the wheel rim 106 to ensure that pressing device 117b (and also the tire 108 with which it is engaged) rotates along with the wheel rim 106 and that the pressing device 117b does not move relative to the wheel rim 106. Alternatively, the pressing device 117b may optionally be coupled with an independent drive mechanism that pushes the bead pressing device 117b and the tire 108 in the direction of rim rotation about the drive axis 112. This is sometimes referred to as establishing a "fraction point" in addition to pushing the tire bead 118 (FIG. 1c) into a drop center 121 of the wheel rim 106 when mounting the tire 108. By pushing the tire in the direction of rotation all slack between the tire 108 and wheel rim 106 is taken up, at which point the force and therefore the friction at the point at which the tire bead crosses over the wheel rim edge just in front of the bead pressing device 117b is increased to sufficiently bind the tire 108 to the wheel rim 106.

As one option, an independent traction point drive mechanism may include a motor 162, 164, 166 (shown in phantom in FIG. 2) coupled to the pressing device 117b to positively rotate it angularly about the drive axis 112 as the tire 108 is rotated. The motor 164 can drive the pressing device 117*b* at the same rotational speed as the spindle is rotated about the axis 112 to ensure that a traction point is established and maintained. The motor 164 may therefore be operated in tandem with the machine drive shaft assembly 104 and coordinated by the same machine controls.

As another option, an independent fraction point mechanism may include a linear actuator with compliance, such as a pneumatic cylinder, or with a slip clutch, coupled to the pressing device 117*b* via a linkage such as a rack and pinion, chain and sprocket, belt and pulley or sheave, or belt and gear drive, to rotate the pressing device 117*b* angularly about the drive axis 112 to establish and maintain a traction point between the tire and rim. This option does not require the linear actuator to be controlled in a manner to exactly match the rotational speed of the machine drive shaft assembly 104 that rotates the wheel rim 106 about the axis 112. In such a case, a simpler control scheme may result.

The pressing tools 117*a*, 117*b* may be spaced from one another to maintain the tire bead 118 in the drop center 121 (FIG. 1*c*) of the wheel rim 106 during tire de-mounting procedures, or to push the tire bead 118 into the drop center 121 in a tire mounting procedure. While two bead pressing devices 117*a* and 117*b* are shown in FIGS. 1*a* and 1*b*, additional bead pressing devices 117 may be provided. Two or more bead pressing devices 117 are beneficial for mounting or de-mounting larger diameter tires and stiffer tires, although it is understood that in some cases a single bead pressing device 117 may be sufficient to mount or de-mount certain types of tires.

The tools 114, 116, and the bead pressing devices 117 serve to supply sufficient tire insertion or removal forces at the correct angle and location with respect to the tire 108 such that the bead 118 of the tire 108 is forced out of or onto a bead seat on the wheel rim 106. While exemplary tire changing tools 114, 116, and bead pressing devices 117 are illustrated, still other tire changing tools and devices may be provided and used for bead breaking, tire mounting and/or demounting, locating a valve stem, locating a wheel weight, locating a wheel sensor such as a Tire Pressure Monitoring System (TPMS) sensor, or other purposes. Such other tools may be provided in addition to or in lieu of the tools 114, 116 and bead pressing devices 117 as depicted.

Like many known machines, the effectiveness of the tire changing machine 100 is largely dependent on the ability of its operator to prepare the rim 106 and correctly position the tire changing tools 114, 116 and the bead pressing devices 117 to install or remove the tire 108 from the wheel rim 106. The bead breaker tool 116 and the mount and demount tool 114 exert respective pressure on the tire 108 to seat or unseat the tire bead 118 from the rim 106 when installing or removing the tire 108, and the bead pressing devices 117 maintain the tire 108 in a desired position relative to the rim 106 as the tools 114 and 116 operate.

More specifically, when the bead rollers 116 are used to exert pressure on the tire 108 to break the tire bead seal 118, the rollers 116 are first brought into contact with the tire 108 as near to the lip of the rim 106 as possible. Down force is applied to the upper roller 116 in a direction (indicated by arrow B in FIG. 1*b*) that is parallel to the wheel axis 112 to push the tire bead 118 off of the rim 106. As the wheel rim 106 and tire 108 are rotated about the axis 112 the tool 114 applies appropriately directed force to the tire 108 to either direct the tire 108 off of the wheel rim 106 (de-mounting) or onto the wheel rim 108 (mounting). Also, downward force and pressure exerted by the bead pressing device 117 facilitates tire de-mounting by applying pressure to the tire 108 to ensure that it stays in the rim drop center 121. The tire 108 is kept in the drop center 121 during de-mounting because the bead 118 cannot stretch over the rim lip 119 (FIG. 1*c*). The drop center 121 allows the tire bead to 118 be positioned eccentric to the rim lip 119 and bead seat. This provides clearance between the tire 108 and the rim lip 119 to allow the tire 108 to be lifted over the rim lip 119 and be removed from the wheel rim 106.

In an effort to address difficulties in properly locating the tire changing tools 114 and 116 and undesirable consequences of improper tool placement, some machines are known having a sensory capability to detect a position of tools such as the tools 114 and 116 with respect to the tire 108 and/or wheel rim 106. For example, one known tire changing machine includes a switch mechanism that changes state when the bead breaker tool moves just beyond the outer edge of the rim, ensuring that the bead breaker is positioned to engage a tire at a predetermined location. Machine vision systems are also known that help align bead breaker tools with respect to the wheel rim at predetermined locations. In known machines, the bead pressing devices are typically manually positioned by the machine operator, presenting difficulties discussed above. In the machine 100, the bead pressing devices 117 are automatically positionable in optimal locations without operator input, providing numerous benefits as described further below.

Also, unlike existing machines, the bead pressing devices 117 are arranged in a manner more amenable to machine control without assistance of a human operator. The machine includes a tower 130 extending from the base 102 at a location spaced from the drive assembly 104, and the tower extends to a height well above the tire 108 and rim 106 when mounted to the machine. A linkage 132 extends outwardly from the tower 130, and the pressing tools 117 are coupled to the linkage 132. The linkage 132 is movable by an actuator in the tower 130 in a direction parallel to arrow B in FIG. 1*b*, such that as the linkage 132 is moved, the bead pressing devices carried on the linkage 132 are moved toward or away from the tire 108. As such, the bead pressing devices 117 may be moved in a direction parallel to the machine drive axis 112. As explained in some detail below, the positioning of the bead pressing devices 117 in the direction parallel to the drive axis may be accomplished in response to a position of one of the tools 114 or 116, which may in turn be manually determined by an operator.

In another embodiment, support structure or linkage carrying the bead pressing devices 117 need not be structurally connected to the tower 130 and/or or the machine base 102. Rather, the support structure for the bead pressing devices may be separately supported on a shop floor at a location adjacent to the machine base 102, while the bead pressing devices 117 are still movable relative to the wheel rim 106 and tire 108 and/or the machine drive axis 112. Support structure for the bead pressing devices 117 may likewise be connected to other parts of the machine besides the tower 130 and/or base 102. Whether independently provided or integrated with the machine 100, the support structure and bead pressing devices 117 may be operated in a similar manner as further described below. That is, the bead pressing action of the devices 117 is not necessarily dependent on the particulars of the support structure involved.

Also, in the illustrative embodiment shown, the bead pressing devices 117 are mounted to the linkage 132 such that they are rotatable about an axis 136 that is fixed and coincident with the machine drive axis 112 in a tire change procedure. That is, the pressing devices 117 are rotatable about the axis 136 that is coaxial with the machine drive axis 112. As such, because the axis 136 is coincident with the drive axis 112, when the bead pressing devices 117 are in contact with the tire 108, the bead pressing devices 117 may rotate with the tire 108 as it is rotated about the drive axis 112. As explained below, the bead pressing devices 117a and 117b may assume such rotation about the axis 136 in sequence at different times as the tire is rotated to ensure effective use of the bead pressing devices 117. Unlike conventional tire changing machines, including but not limited to so-called swing-arm style machines, the rotational axis 136 for the pressing devices 117 is fixed at a set distance and location from the tower 130 in an exemplary embodiment. A more compact machine arrangement and work area is therefore provided compared to some conventional machines.

While locating the rotational axis 136 of the pressing devices 117 at a fixed and set distance and location from the tower 130 can be beneficial for the reasons stated, it is recognized that in further and/or alternative embodiments neither the location of the drive axis 112 nor the rotational axis 136 for the pressing devices need necessarily be fixed in such a manner so long as the axes 112 and 136 are positionable to become coincident when the pressing devices 117 are needed. That is, either or both of the axes 112 and 136 may be movable to different operating positions, distances and orientations relative to each other and relative to the tower 130 for reasons not pertinent to use of the pressing devices 117, but when the pressing devices 117 are to be engaged to the tire, the axes 112 and 136 are moved to become coincident once again so that the bead pressing devices 117 may rotate with the tire 108 about the drive axis 112 as explained below.

The bead pressing devices 117 are further movable in a direction perpendicular to the axis 136 and the drive axis 112. That is, actuators are provided that move the bead pressing devices 117 toward and away from the drive axis 112, such that the bead pressing devices 117 may be manually or automatically adjusted to different radial positions measured from the drive axis 112 to accommodate tires and rims of different diameters. The bead pressing devices 117 may also be manually or automatically positioned in the direction perpendicular to the drive axis 112 as described below.

The positions of the tools 114 and 116, the bead pressing devices 117, and operation of the drive assembly 104 and other features may be coordinated by a control unit 120 that may include a controller (discussed below) and actuator components operatively connected to the controller. In particular, the control system 120 may capably move the bead pressing devices 117 to optimal positions for engagement with the tire in tire mount and de-mount procedures, as well as control the motion of the bead pressing devices 117 during tire mount or de-mount procedures, to successfully and conveniently accomplish tire mount and de-mount procedures for varying sizes and diameters of wheel rims 106 with reduced input and effort of a person using the machine.

A machine operator may manipulate input selectors 110a, 110b and 110c, for example, which communicate with the control unit 120 to move the tools 114, 116 to desired positions and/or to operate the drive assembly 104 or activate other machine features. In illustrative embodiments, the input selectors 110a, 110b and 110c may be foot pedals located near the bottom of the machine base 102 for convenient use of the machine operator(s). In other embodiments, other known input selectors, including but not limited to levers, buttons, knobs, switches, joysticks, and touch sensitive screens may be employed in various locations on or near the machine 100. An operator station 122 including a display 124 and an input device 126 including a keyboard or other input selectors may be optionally provided for the benefit of the operator. Still other features of the machine may be provided, such as tire inflation systems and the like familiar to those in the art.

Figure 2:
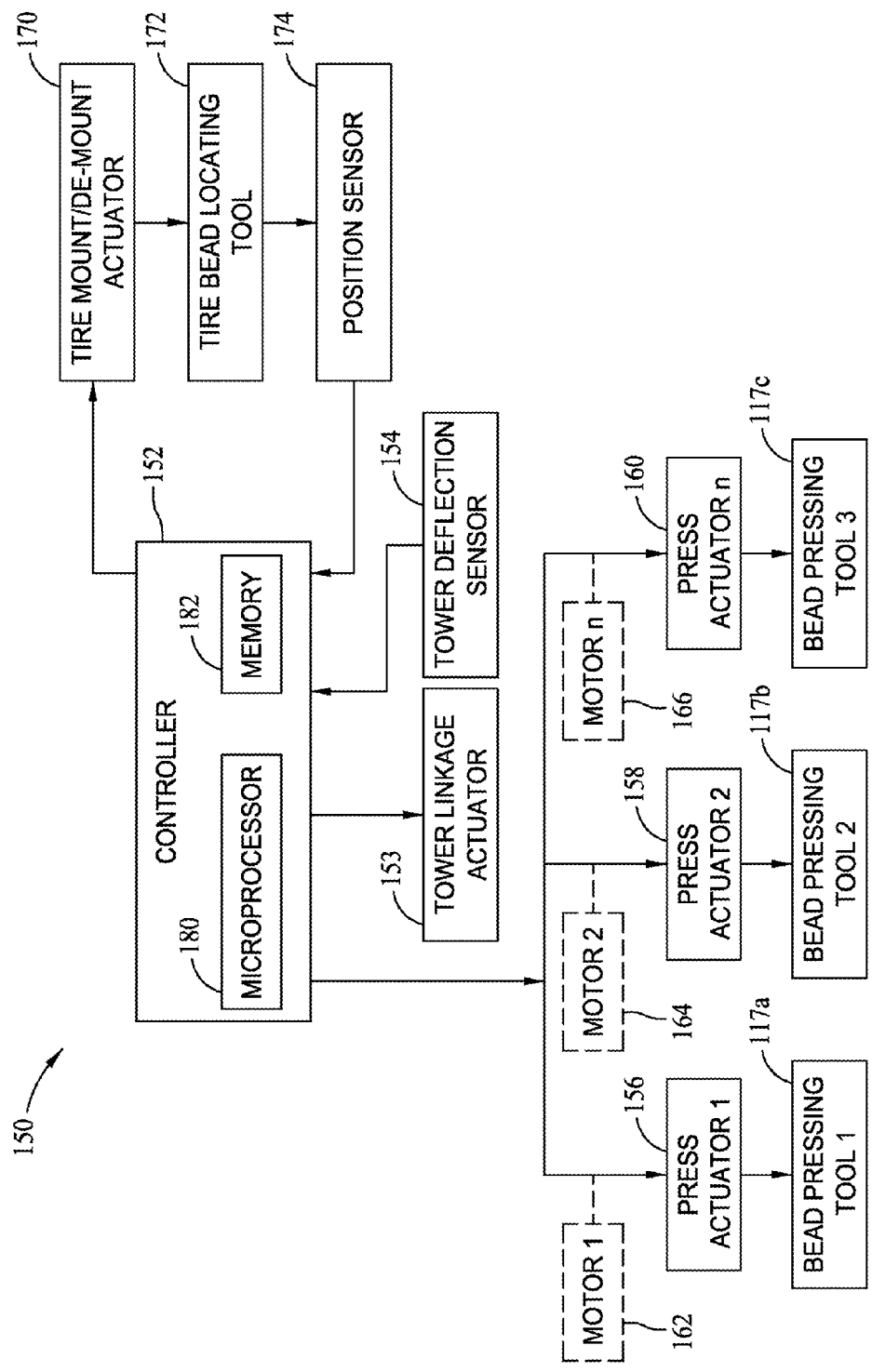
FIG. 2 schematically illustrates an exemplary control system for the machine shown in FIGS. 1a, 1b and 1c.

FIG. 2 schematically illustrates an exemplary control system 150 that may be used with the machine 100 for more optimal use and control of the machine 100 to change tires.

As shown in the embodiment of FIG. 2, the control system 150 generally includes a controller 152 operatively coupled to a tower linkage actuator 153 that moves the linkage 132 (FIG. 1a) in a direction parallel to the machine drive axis 112 (FIG. 1a) toward or away from the tire 108 in a mount or de-mount procedure. A tower deflection sensor 154 may optionally be provided an input to the controller 152. Forces may be generated in tire mount and de-mount operations that are sufficient to cause the tower 130 (FIG. 1a) to deflect, distort or bend, and the sensor 154 may provide a basis to determine the amount of deflection and adjust the position accordingly. Alternatively, the sensor 154 may detect mechanical stress or strain in the tower 130 as the machine is used, and the detected stress or strain may be correlated with empirically determined or estimated amounts of deflection that may be utilized to adjust a position of the linkage 132 and/or the associated pressing devices 117. Stress and strain sensors, or additionally other types of sensors familiar to those in the art may be utilized as the deflection sensor 154.

A dedicated tower deflection sensor 154 as illustrated is by no means required, however, and may be considered optional in some embodiments. It is possible, for example, that the tower deflection can be sensed or estimated by other optional sensors provided in the machine 100 and associated with other machine components, including but not necessarily limited to a force sensor associated with the bead break roller 116 (FIGS. 1a, 1b and 1c), a force sensor associated with the mount/demount tool 114 (FIGS. 1a, 1b and 1c), and a force sensor associated with the drive assembly 104. Exemplary force sensors for such machine components that may optionally be used to determine tower displacement are described in commonly owned U.S. patent application Ser. No. 12/504,217 filed Jul. 16, 2009, the disclosure of which is hereby incorporated by reference in its entirety. It is contemplated, however, that still other force sensors may be provided and used to determine tower displacement if desired.

The controller 152 is also operatively coupled to a number of actuators 156, 158, 160 associated with a respective bead pressing device 117a, 117b, and 117c (if provided). The actuators 156, 158, and 160 move the bead pressing devices 117a, 117b, 117c in a direction perpendicular to the machine drive axis 112 (FIG. 1a) so that the tools can be adjusted for use with tire and rims having different diameters. The tower deflection sensor 154 may also serve as a control input for positioning of the actuators 156, 158, and 160 in the direction perpendicular to the machine drive axis 112.

As shown in FIG. 2, actuators 1 through n (designated as 156, 158 and 160) may be provided in various embodiments. In general, a greater number of actuators and bead pressing devices may be more advisable as the diameter of the rim 106 (FIG. 1a) and tire 108 (FIG. 1a) is increased and as the stiffness of the tire 108 increases. It is believed, however, that two actuators (e.g., actuators 158 and 160) and two pressing devices, such as the pressing devices 117a and 117b are sufficient to service a good variety of tires and rims now in use for vehicles. If desired, position feedback sensors may be provided for the respective actuators 156, 158, and 160 to provide closed loop control features for the bead pressing devices 117a, 117b, 117c. Optionally, one or more independently operable traction point drive elements such as rotary actuators in the form of motors 162, 164, 166 (shown in phantom in FIG. 2), or other traction point drive elements such as a linear actuated (e.g., cylinder) chain mechanism or rack and pinion may also be provided and coupled to the controller 152 and the pressing devices 117a, 117b, 117c to rotate them angularly about the drive axis 112 to desired positions, and also to hold and release the pressing devices 117a, 117b, 117c for rotational movement as further explained below.

The controller 152 is also operatively coupled to a tire mount or de-mount actuator 170 associated with a tire bead locating tool 172 that may correspond to one of the tools 114 or 116 (FIGS. 1a, 1b, 1c). Alternatively, a reference location of the tire bead could be determined with an input element. In various embodiments, the input element may include, but is not necessarily limited to a position sensor, operator manual input, a dataset arm, machine vision, or other tire bead locating tool familiar to those in the art. The mount or de-mount actuator 170 positions the tire bead locating tool 172 with respect to the tire bead. While one mount/de-mount actuator is shown in FIG. 2, it is understood that more than one actuator 170 may actually be involved to move the tire bead locating tool 172 along different axes of motion (e.g., directions parallel and perpendicular to the drive axis 112) if desired. Alternatively, it is recognized that different actuators may be provided to position different tire bead locating tools 172 (e.g., different actuators associated with the tools 114 and 116). A position sensor 174 is also provided and inputs a feedback signal to the controller 152 concerning the position of the tire bead locating tool(s) 172 in use. One or more position sensors 174 may be provided in various embodiments to detect positions of different tire bead locating tools 172 or to detect a position along different axes of motion (e.g., an axis parallel to the machine drive axis 112 and an axis perpendicular to the machine drive axis 112) of the same bead locating tool 172.

In various control schemes contemplated, the engagement position of the tire bead locating tool 172 may be manually set or input by a human operator, determined by the machine using automated techniques, or be correlated with data and information allowing the engagement position to be determined. Such data and information in exemplary embodiments may include tire and rim data and/or pre-defined control algorithms and routines including data and information allowing the proper engagement position to be determined for specific types of tires and rims. In different embodiments, the data and information may be stored on the machine, input by the operator, or retrieved from other sources including but not limited to separately provided computer systems and communication networks via which the desired data and information is available.

The engagement position of the tire bead locating tool 172 is of great practical interest as the engagement position of the tire bead locating tool 172 provides some indication of the diameter of the rim 106 and its edge location, as well as some indication of the location of the tire bead. Once this information is known to the controller 152, it may be used to accordingly position the bead pressing devices 117a, 117b, 117c at a corresponding elevation (i.e., a position in the direction parallel to the drive axis 112) to the locating tool 172, and at a corresponding radial distance (i.e., a distance measured in a direction perpendicular to the machine drive axis 112) to the locating tool 172. In exemplary embodiments, the corresponding elevation and radial distance may be offset by a predetermined amount from the known or determined position of the tire bead locating tool 172. That is, the bead pressing devices 117a, 117b, 117c may be positioned approximately equal to, above or below the position of the tire bead locating tool 172, and the bead pressing devices 117a, 117b, 117c may be positioned radially from the rim by a different amount than the tire bead locating tool 172. Nonetheless, in an exemplary embodiment the controller 152 automatically operates the actuators 153, 156, 158, and 160 (and also the actuators 162, 164 and 166 if provided) to the corresponding elevation and radial positions once the position of the tire bead locating tool 172 is set. While automatic positioning of all of the bead pressing devices 117a, 117b, 117c has apparent benefits, in another embodiment less than all of the bead pressing devices 117a, 117b, 117c may be automatically positioned, and one or more of the bead pressing devices 117a, 117b, 117c may alternatively be manually positioned in an appropriate location relative to the bead locating tool 172 by the machine operator.

In various embodiments, the controller 152 may be for example, a microcomputer, a programmable logic controller, or other processor-based device. Accordingly, the controller 152 may include a microprocessor 180 and a memory 182 for storing instructions, control algorithms and other information as required to function in the manner explained below. The controller memory 182 may be, for example, a random access memory (RAM), or other forms of memory used in conjunction with RAM memory, including but not limited to flash memory (FLASH), programmable read only memory (PROM), and electronically erasable programmable read only memory (EEPROM). Alternatively, non-processor based electronics and circuitry may be provided in the controller 152 with equal effect to serve similar objectives. For example, a supercapacitor may be provided to give the controller time to store procedure sensitive data such as the current state in a software based state machine in the event of power loss. Other elements such as line filters and capacitors for filtering noisy power may be included. Disk storage such as a CD-ROM, DVD, or hard disk may be provided for storage of various tire profiles that may be recalled to optimize the tire mount or de-mount process. The tire profiles may include detailed data regarding dimensional aspects of tires to be changed and other information concerning the tires that may be useful and beneficial to the machine operator or the control system.

In various exemplary embodiments of the control system 150, the actuators 153, 156, 158, 160 and 172 (and also the actuators 162, 164 and 166 if provided) may respectively include hydraulic cylinders, pneumatic actuators, electric motors, or still other types of actuators. The actuator types for the actuators 153, 156, 158, 160 and 172 (and also the actuators 162, 164 and 166 if provided) may be of the same or different type (e.g., hydraulic, pneumatic, electric or other) in numerous variations of machines.

Likewise, in various embodiments, the position sensors utilized in the control system 150 may include positioning encoders, Hall Effect sensors, machine vision elements and other sensors and technologies known in the art. More than one type of positioning sensor or sensing technology may be utilized in numerous variations of machines.

Figure 3:
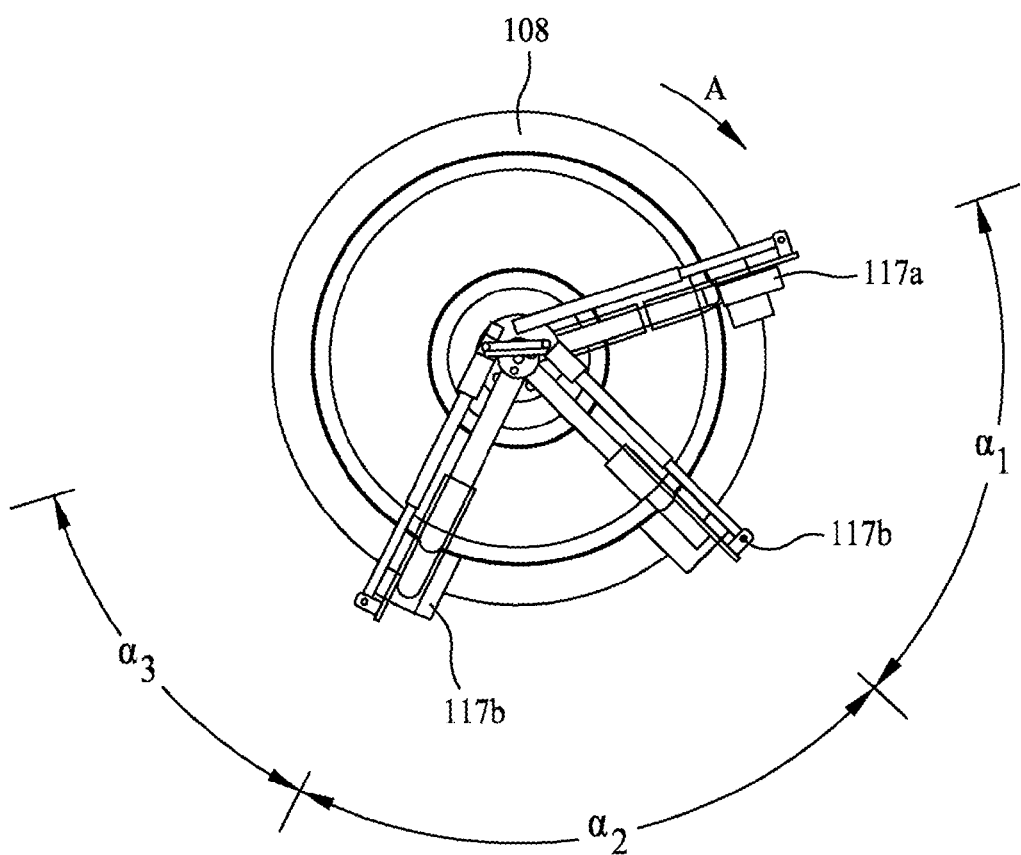
FIG. 3 is a top view of a portion of the machine illustrating exemplary motion sequences of the machine bead pressing devices.

FIG. 3 is a top view of a portion of the machine 100 illustrating exemplary motion sequences of the machine bead pressing devices 117a and 117b. The pressing device 117a, which is a roller type device, is shown in a start position in engagement with the tire 108, but being held in a fixed angular position as the tire 108 is rotated about the drive axis 112 (FIGS. 1a and 1b) in the direction of arrow A. The pressing device 117a is held in this position until a predetermined amount of rotation of the tire 108 about the drive axis 112 (FIG. 1a) in the direction of arrow A has occurred. In exemplary embodiments, such amount of rotation in the direction of arrow A may be determined using an open loop control scheme wherein the drive shaft assembly 104 is operated at a known rotational speed for a predetermined amount of time, or a closed loop control scheme wherein a position of the drive shaft assembly 104 relative to the drive axis 112 is sensed and fed back to the controller 152. Suitable position sensors for use with a closed loop control scheme are described in U.S. patent application Ser. No. 12/504,217 referred to above and incorporated herein by reference. While a clockwise rotation of the tire 108 is shown in FIG. 3, it is recognized that a counter-clockwise rotation could be used with equal effect if another embodiment.

While not shown in FIG. 3, the pressing device 117b is initially located immediately adjacent the pressing device 117a at the beginning of the tire change operation in engagement with the tire. While the pressing device 117a is held in the fixed angular position at or near the starting point, the pressing device 117b rotates with the tire 108 in the direction of arrow A as the tire change procedure commences. As such, while the pressing device 117b freely rotates with the tire, or is driven by a traction point drive element to establish and maintain a traction point between the rim 106 and the tire 108, the pressing device 117b moves away from the pressing device 117a that is held stationary in position and does not rotate about the drive axis 112. Thus, as shown in FIG. 3, the pressing device 117b has moved an angular distance $\alpha_1$ from the pressing device 117a as the tire 108 has rotated by the same amount in the direction of arrow A. The pressing device 117a, however, remains at the starting point.

As also shown in FIG. 3, the pressing device 117b continues to rotate an additional angular distance $\alpha_2$ with the tire 108. When a predetermined amount of tire rotation has occurred, which in this example corresponds to the sum of $\alpha_1$ and $\alpha_2$, the pressing device 117a is released and the pressing device 117a begins to rotate with the tire in the direction of arrow A, but trailing the pressing device 117b by the angular distance $\alpha_1$ plus $\alpha_2$. In the event that the pressing device 117a does not begin to rotate when released, a linkage coupled to the pressing device 117b may be provided to cause the pressing device 117a to rotate with the pressing device 117b at the desired spacing of $\alpha_1$ plus $\alpha_2$.

Eventually, as the tire 108 continues to rotate in the direction of arrow A for an additional angular distance $\alpha_3$, the pressing device 117b reaches a stop point. Typically the tire 108 is fully mounted at this time. If the tire 108 isn't fully mounted the tire 108 will continue to rotate and the tire 108 will slide under the pressing device 117b while the pressing device 117a continues to rotate with the tire 108, keeping the tire 108 in the drop center 121 of the wheel rim 106. Alternatively, at the stop point, the pressing device 117b ceases to continue rotating in the direction of arrow A and the plurality of bead press rollers are disengaged from the tire 108. The tire 108, however, continues to be rotated for at least the angular amount of $\alpha_1$ plus $\alpha_2$ (and possibly plus $\alpha_3$ as well) until the pressing device 117a also reaches a stop point where it too ceases to rotate in the direction of arrow A.

Cam mechanisms and the like, or other techniques in the art, may be utilized to selectively hold and release the pressing device 117a, and to ensure that the devices 117a and 117b rotate only to the respective stopping points and no further. It is believed that those of ordinary skill in the art, after reading the present disclosure, could implement such features without further explanation. Additionally, the holding or releasing of the pressing device 117a could be accomplished with the controller activating locking or unlocking devices and the like to allow or prohibit rotating of the device 117a, as also believed to be within the purview of those in the art in view of the teachings of the present disclosure. In still another embodiment, the motors 162, 164, 166 (FIG. 2) or other traction point drive elements may be selectively energized or de-energized to release or hold the pressing devices 117

It should now be apparent that at least three distinct phases of motion of the pressing devices occurs in sequence as the tire change procedure is preformed. In a first phase, the pressing device 117a is held at or near the start position while the pressing device 117b rotates with the tire 108. In a second phase, the pressing device 117a is released and rotates with the tire 108 at an angular distance from the pressing device 117b. In a third phase, the pressing device 117b has reached the stop point and ceases rotating with the tire 108, while the pressing device 117a continues to rotate with the tire 108. Eventually, the pressing device 117a also reaches a stop point and ceases rotating, at which point the rotation of the tire 108 may continue or may be stopped.

With some strategic selection of the angular distances or amounts of rotation corresponding to the phases of motion described above, a variety of differently sized and types of tires and rims may be utilized with the machine, without the human operator having to be concerned with positioning of the pressing devices 117a and 117b. Time associated with trial and error positioning of the pressing devices is saved, especially for larger diameter rims and stiff walled tires, and tires may consequently be changed much more efficiently and conveniently. Also, installation and removal of accessories such as spacing clips to change certain sizes of tires is nullified by the automatic positioning of the pressing devices 117a, 117b as described. Tires that are extremely difficult, if not impossible, to change with conventional machines may be changed with relative ease using the machine 100.

FIGS. 4-12 further illustrate the motion of the pressing devices 117a and 117b in use in an exemplary embodiment.

Figure 4:
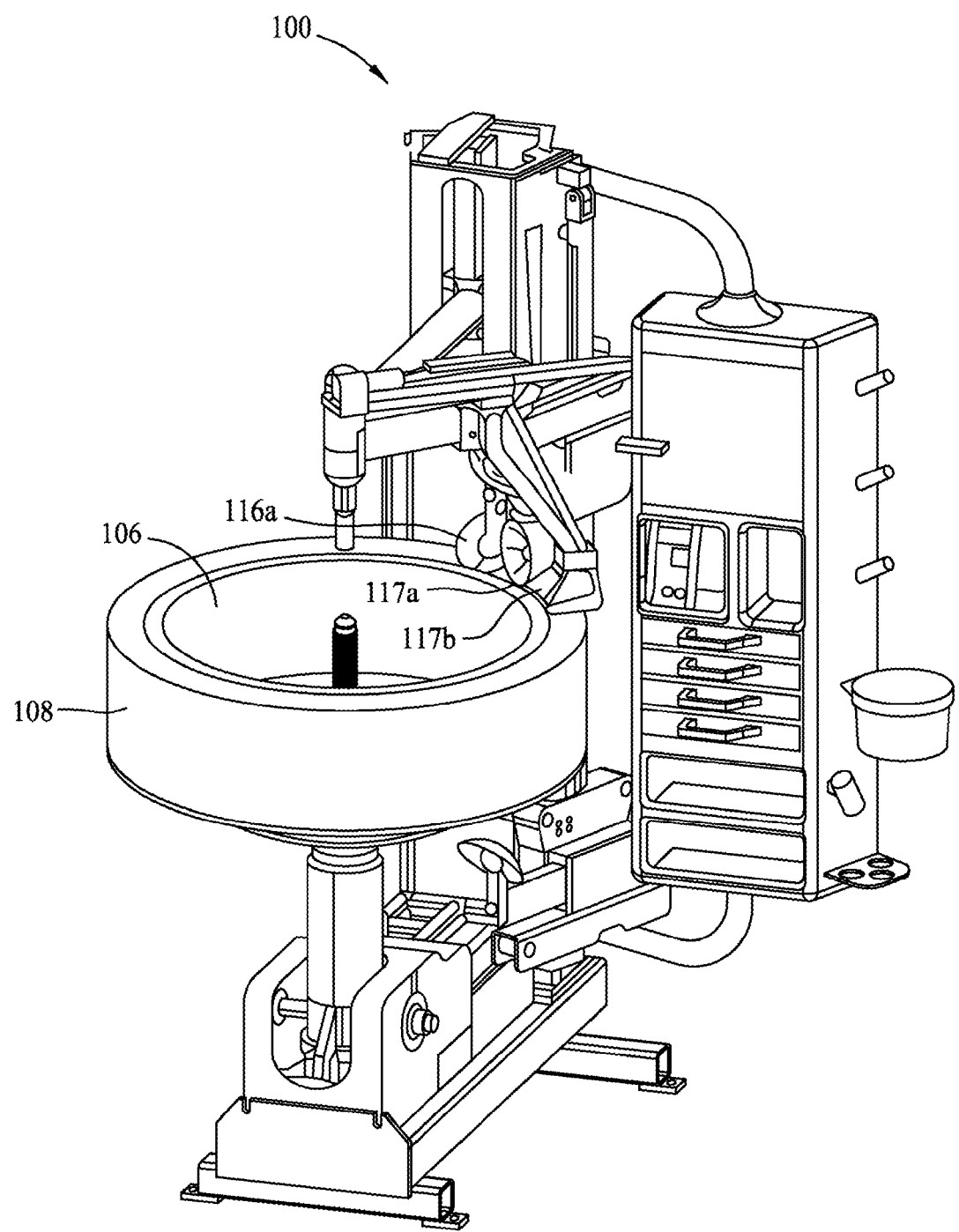
FIG. 4 is a perspective view of the machine with the bead pressing devices in a starting position of a tire mount mode for the machine.
Figure 5:
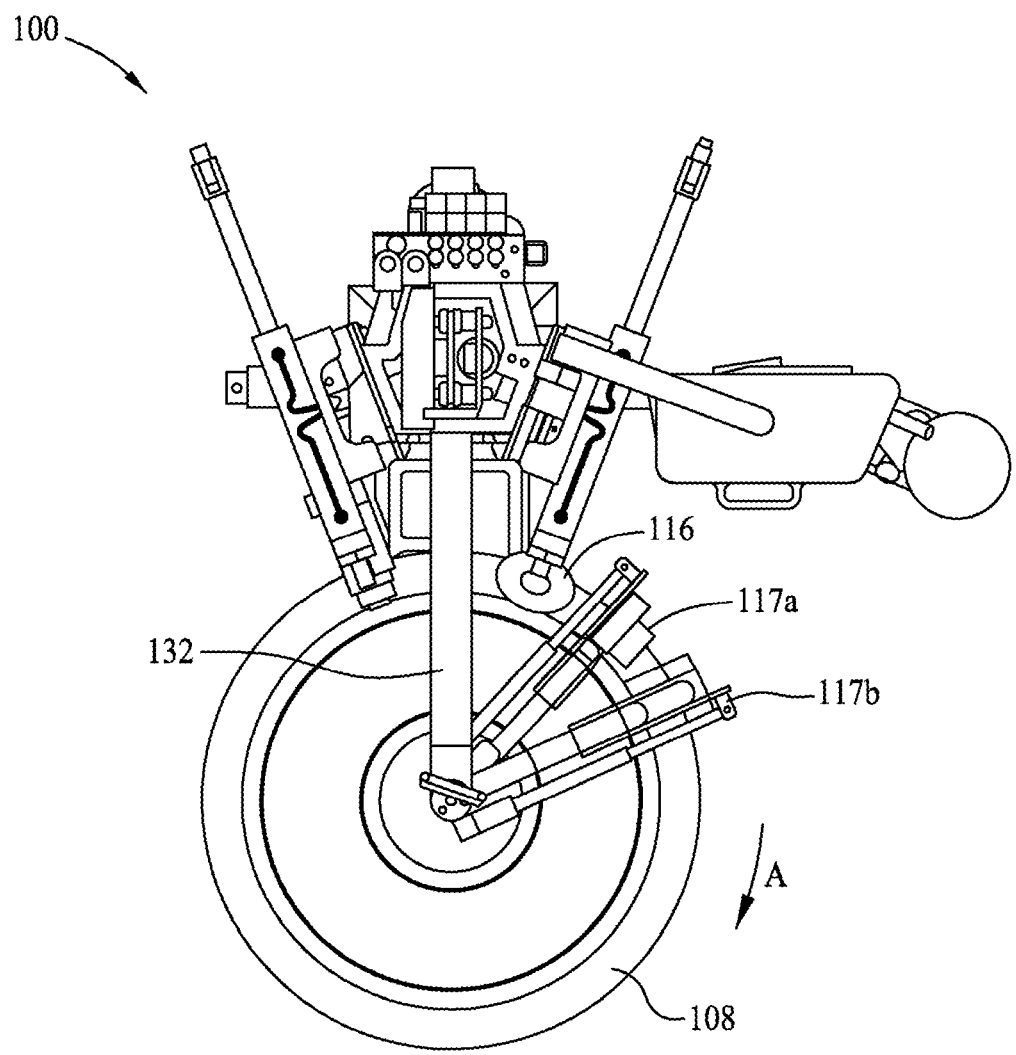
FIG. 5 shows the bead pressing devices in the starting position in top view.

FIGS. 4 and 5 illustrate the starting positions for the pressing devices 117a and 117b in a tire mount mode. The bead breaking tool 116 has been moved to the proper engagement position, and the bead pressing devices 117a, 117b are accordingly moved in directions parallel to and perpendicular to the machine drive axis 112 to the starting position as shown. The pressing device 117a is positioned adjacent the bead breaking tool 116 and the pressing device 117b is positioned proximate the pressing device 117a. At this position, the bead breaker tool 116 pushes the tire bead down in the rim drop center 121 (FIG. 1c) and the tire is rotated in the direction of arrow A about the drive axis 112. The pressing devices 117a and 117b apply downward force and pressure to maintain the tire bead in the rim drop center 121 after the bead breaking tool 116 has placed it there.

Figure 6:
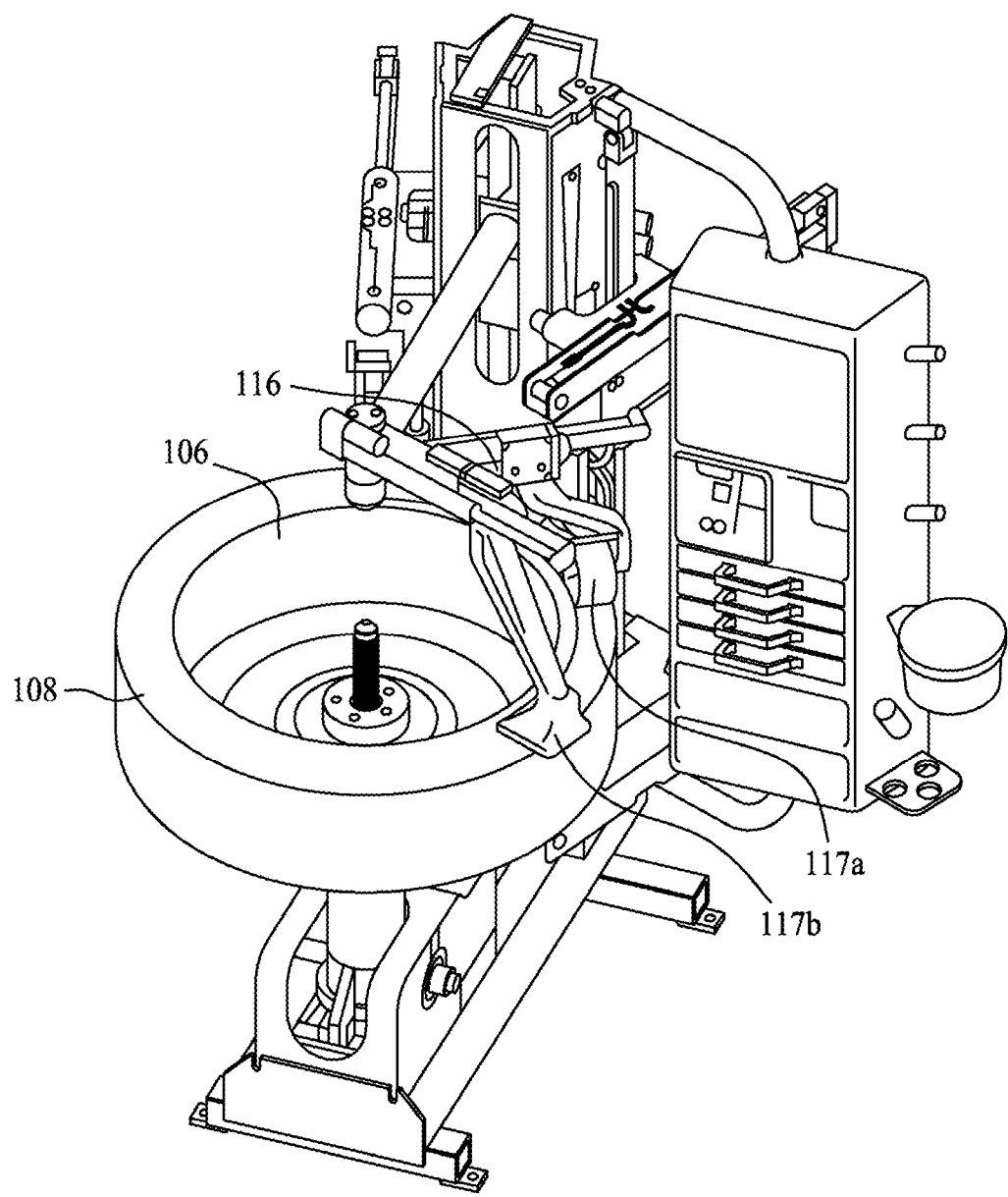
FIG. 6 illustrates one of the bead pressing devices being released in the tire mount mode.

As shown in FIG. 6, the pressing device 117b rotates with the tire 108, with or without assistance of a traction point drive element. The pressing device 117a may remain in position relative to the bead breaking tool 116 or rotates with the tire 108 for a short distance and thereafter is held from rotating any further. Both the pressing devices 117a and 117b continue to apply the downward pressure at their respective locations on the tire 108. This continues until a predetermined angular amount of tire rotation about the drive axis 112 in the direction of arrow A (FIGS. 3 and 5) has occurred. In an exemplary embodiment the predetermined amount of tire rotation is slightly more than 90°, and more specifically about 105°. It is understood however, that greater or lesser predetermined amounts of rotation could alternatively be selected for similar purposes with similar results.

Figure 7:
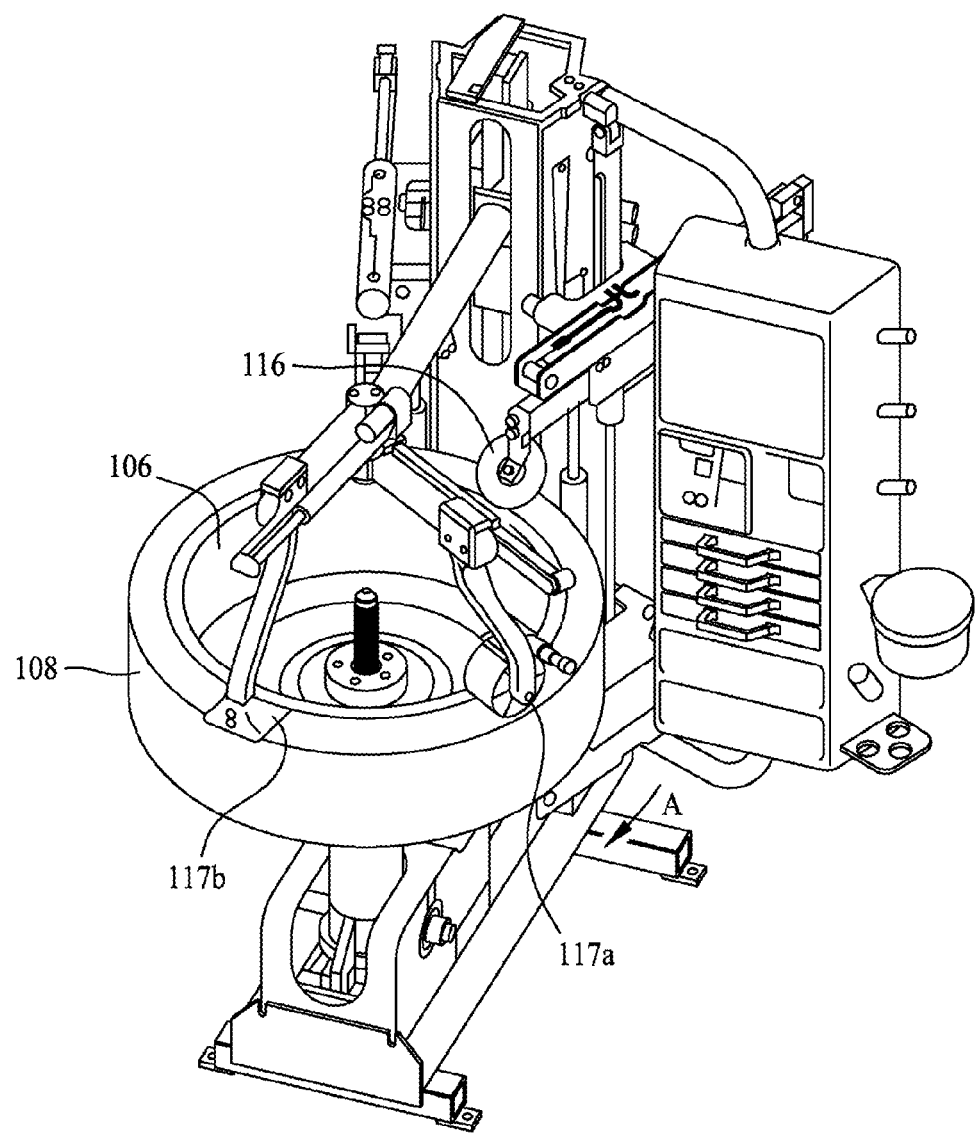
FIG. 7 illustrates in perspective view each of the bead pressing devices being released in the tire mount mode.
Figure 8:
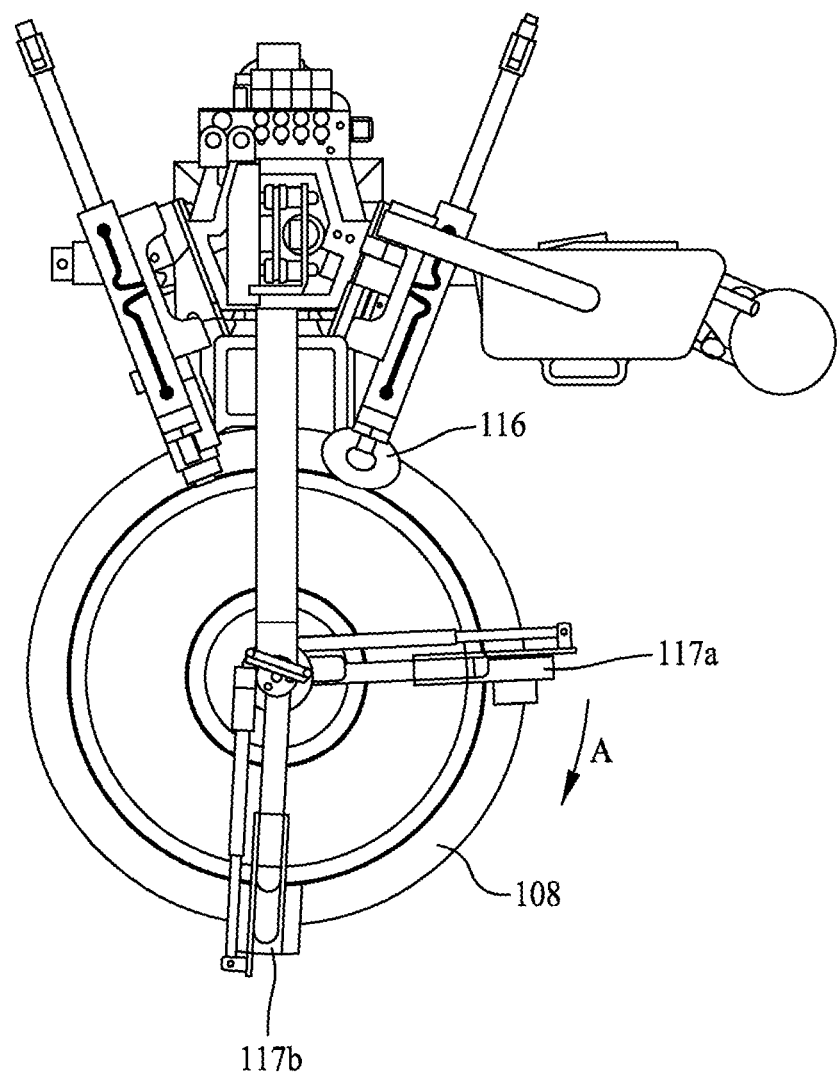
FIG. 8 shows the bead pressing devices of FIG. 7 in top view.

FIGS. 7 and 8 show the continued rotation of the tire 108 past the predetermined amount. The pressing device 117a is now released and rotates with the tire 108 (either freely or with the assistance of a traction point drive element) in addition to the pressing device 117b. The pressing device 117a now travels away from the bead breaking tool 116, and is spaced from the pressing device 117b by an amount approximately equal to the predetermined amount of tire rotation before the pressing device 117a was released. Both the pressing devices 117a and 117b continue to apply the downward pressure at their respective locations on the tire 108 as the rotation continues. If the pressing device 117a for some reason does not rotate with the tire 108 once it is released, a link may optionally be provided between the pressing devices 117a and 117b forcing the device 117a to follow the device 117b.

Figure 9:
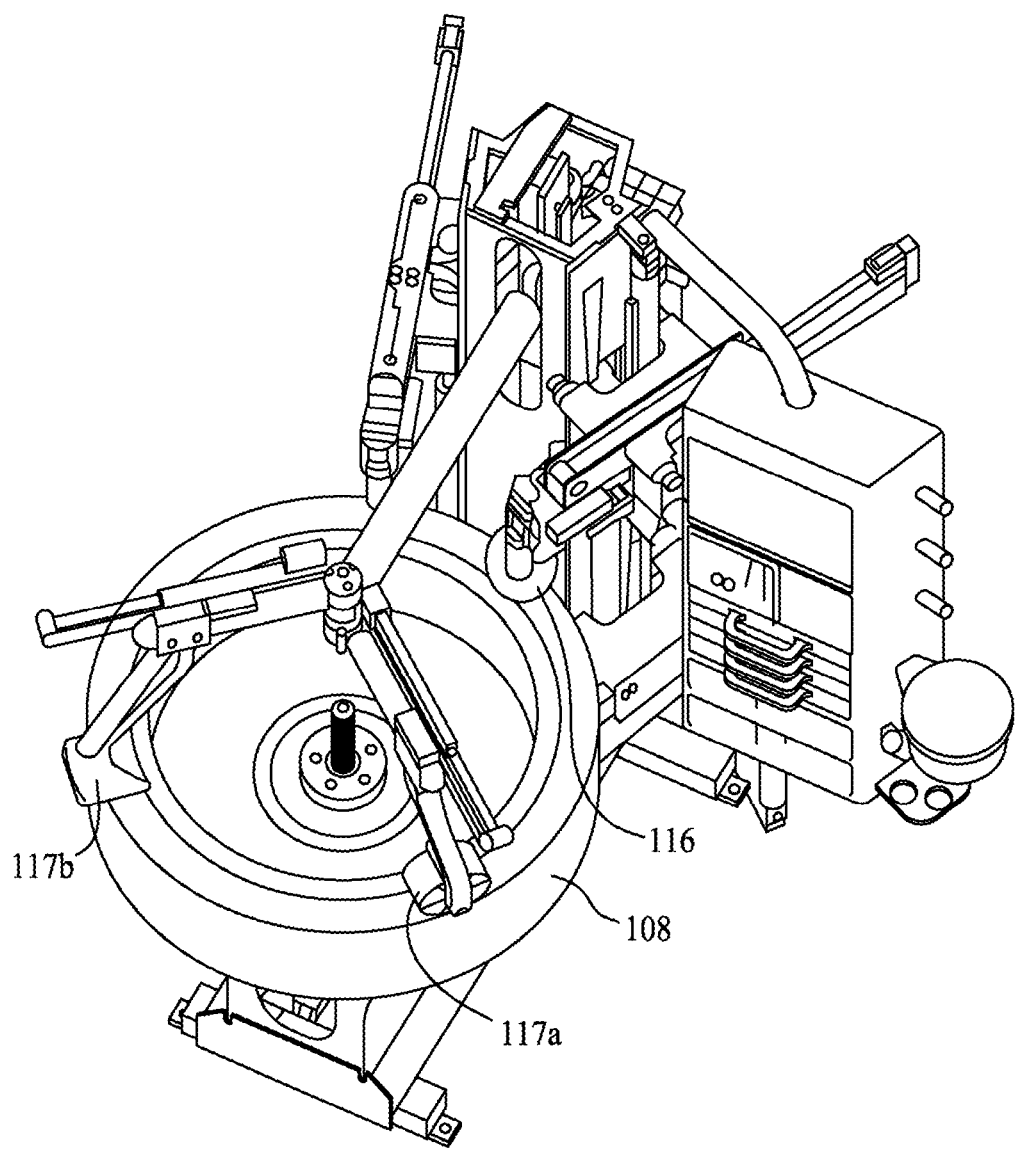
FIG. 9 illustrates in perspective view further movement of the pressing devices in the tire mount mode.
Figure 10:
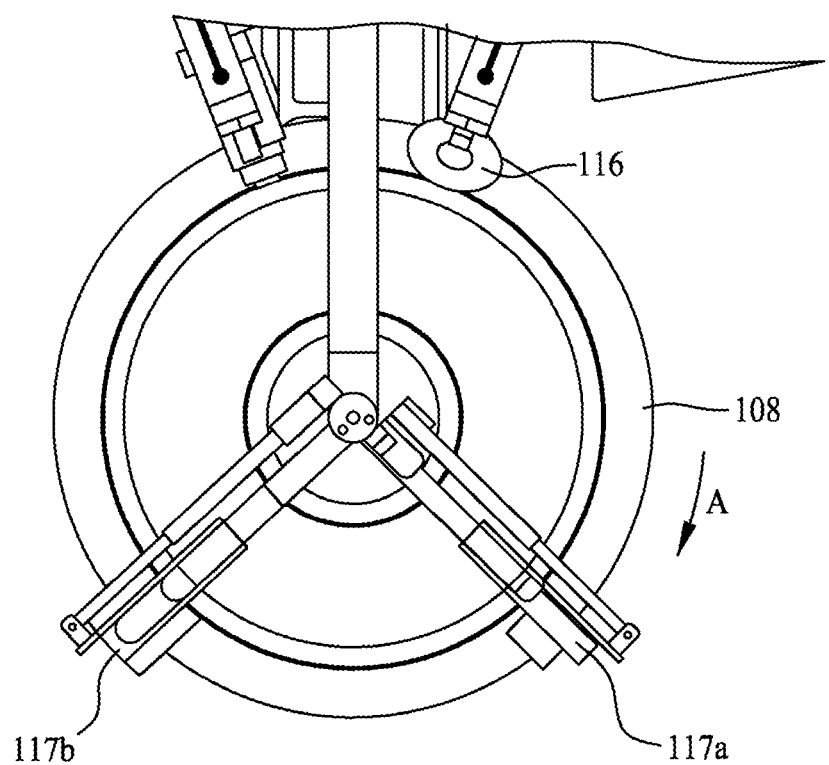
FIG. 10 shows the bead pressing devices of FIG. 9 in top view.

FIGS. 9 and 10 illustrate further rotation of the tire 108, and also the pressing devices 117a and 117b. The angular distance between the pressing device 117a and the bead breaking tool 116 is increasing, while the angular separation of the pressing devices 117a and 117b stays the same. Both the pressing devices 117a and 117b continue to apply the downward pressure at their respective locations on the tire 108 as the rotation continues.

Figure 11:
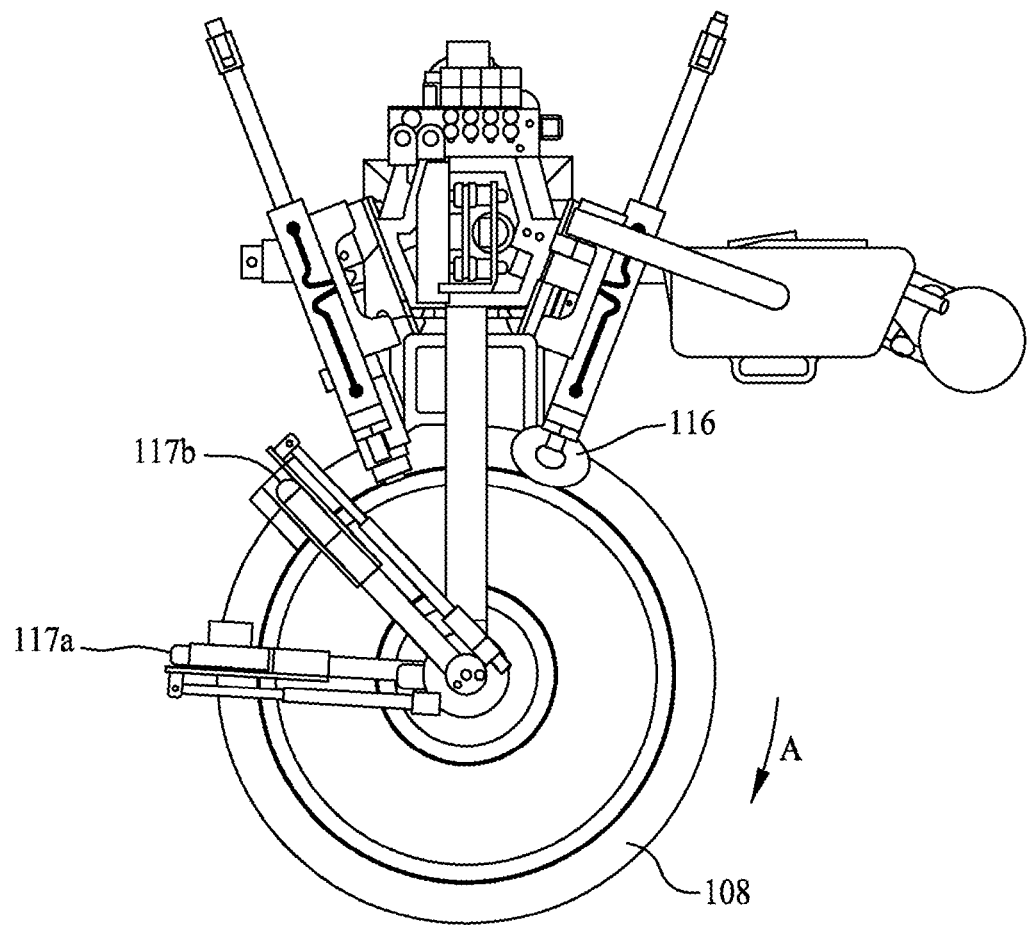
FIG. 11 in top view shows one of the bead pressing devices reaching a stop position in the tire mount mode.

FIG. 11 shows further tire rotation and the pressing device 117b at the stop position. Typically, the tire 108 is fully mounted to the wheel rim 106 at this time. If the tire 108 is not fully mounted, the tire 108 will continue to be rotated and the tire 108 will slide under the device 117b while the device 117a continues to rotate with the tire 108 keeping the tire 108 in the drop center 121. Alternatively, at the stop point, the pressing device 117b ceases to continue rotating in the direction of arrow A and the plurality of bead press rollers are disengaged from the tire 108. The tire 108, however, continues to be rotated for at least the angular amount of $\alpha_1$ plus $\alpha_2$ until the pressing device 117a also reaches a stop point where it too ceases to rotate in the direction of arrow A. Alternatively, and as mentioned above, the pressing devices 117a, 117b may be driven to their stop points by the motors 162, 164, 166 (FIG. 2) or other traction point drive mechanism that forces angular rotation of the bead pressing devices 117a, 117b and the tire 108 in the same direction as the drive shaft assembly 104 rotates the wheel rim 106.

Figure 12:
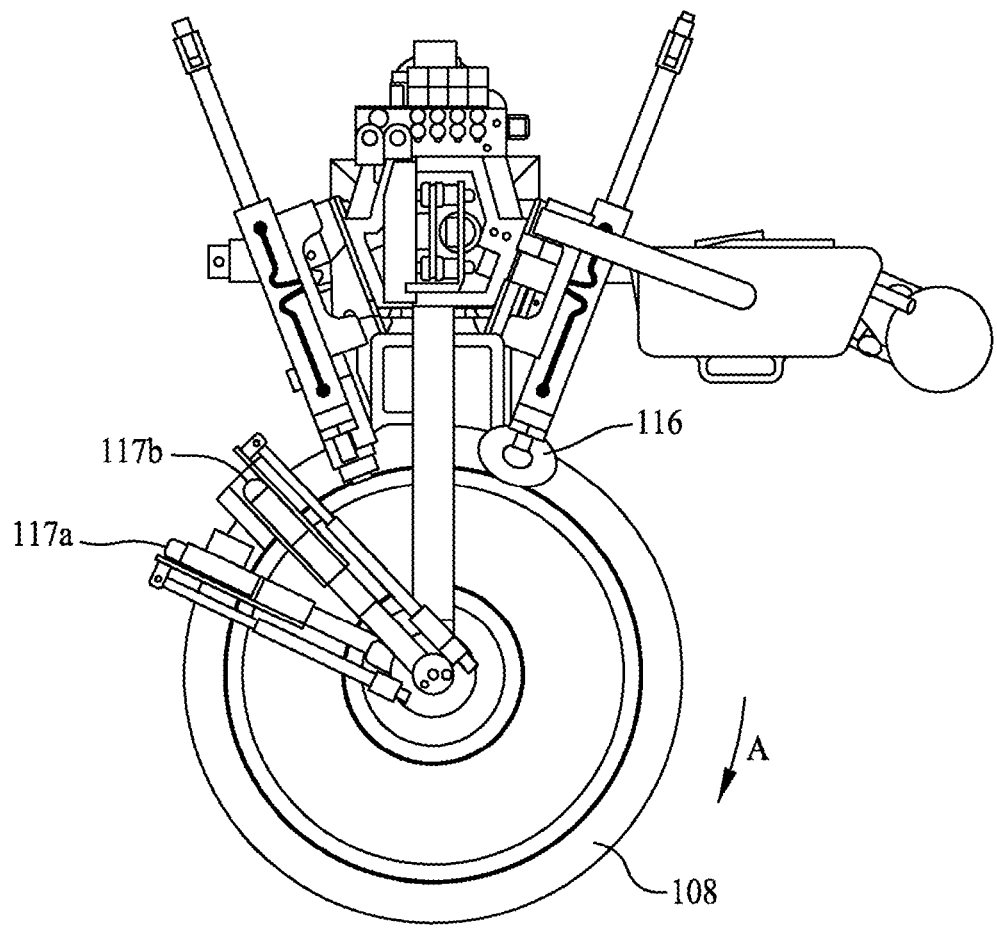
FIG. 12 illustrates in top view each of the pressing devices in a stop position.

FIG. 12 shows the pressing device 117a reaching its stop position. The pressing device is then disengaged from the tire 108. By now, the entire circumference of the tire bead should be successfully located in the rim drop center 121 (FIG. 1c). The tire rotation may be stopped as the 108 tire has been successfully mounted.

While FIGS. 4-12 illustrate operation of the pressing devices 117a and 117b in conjunction with the bead breaker tool 116, the pressing devices 117a and 117b may be operated similarly in conjunction with the mount or de-mount tool 114 (FIGS. 1a, 1b, 1c) or another reference point as desired.

Figure 13:
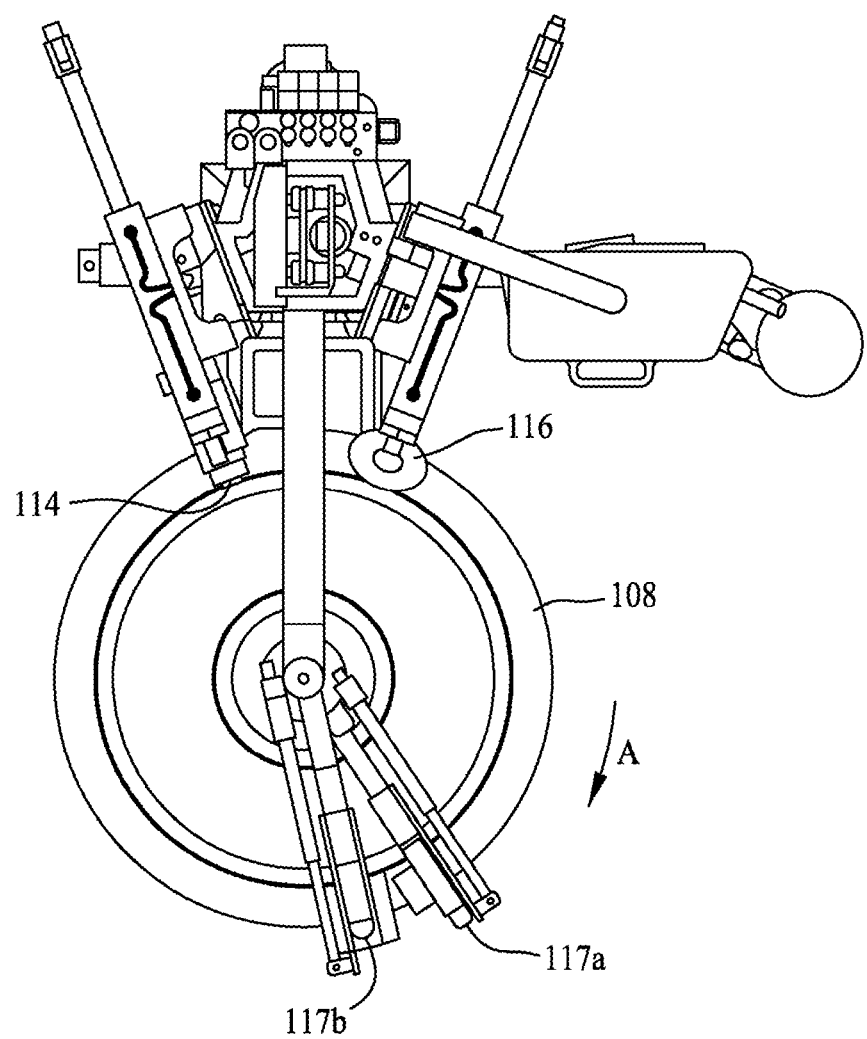
FIG. 13 shows in top view a starting position of the pressing devices in a tire de-mount mode.

FIG. 13 shows an exemplary starting position of the pressing devices 117a and 117b in a tire de-mount mode. The tire de-mount tool 114 has been moved to the proper engagement position, and the bead pressing devices 117a, 117b are accordingly moved in directions parallel to and perpendicular to the machine drive axis 112 to the starting position as shown. In contrast to the starting position for the tire mount mode wherein the pressing devices 117a, 117b are located alongside the bead breaker tool 116, in the de-mount mode the starting position for the pressing devices 117a, 117b are preferably located in diametrically opposing position to the tire de-mount tool 114. Depending on tire and rim geometry alternate positions may be used also. The pressing devices 117a and 117b apply pressure to the tire 108 to aid the de-mounting process.

The machine operator may select between the tire mount and de-mount modes via one of the input selectors described above or in any manner known in the art, with the machine moving the pressing devices 117a and 117b to distinct operating positions for the mount and de-mount modes.

Figure 14:
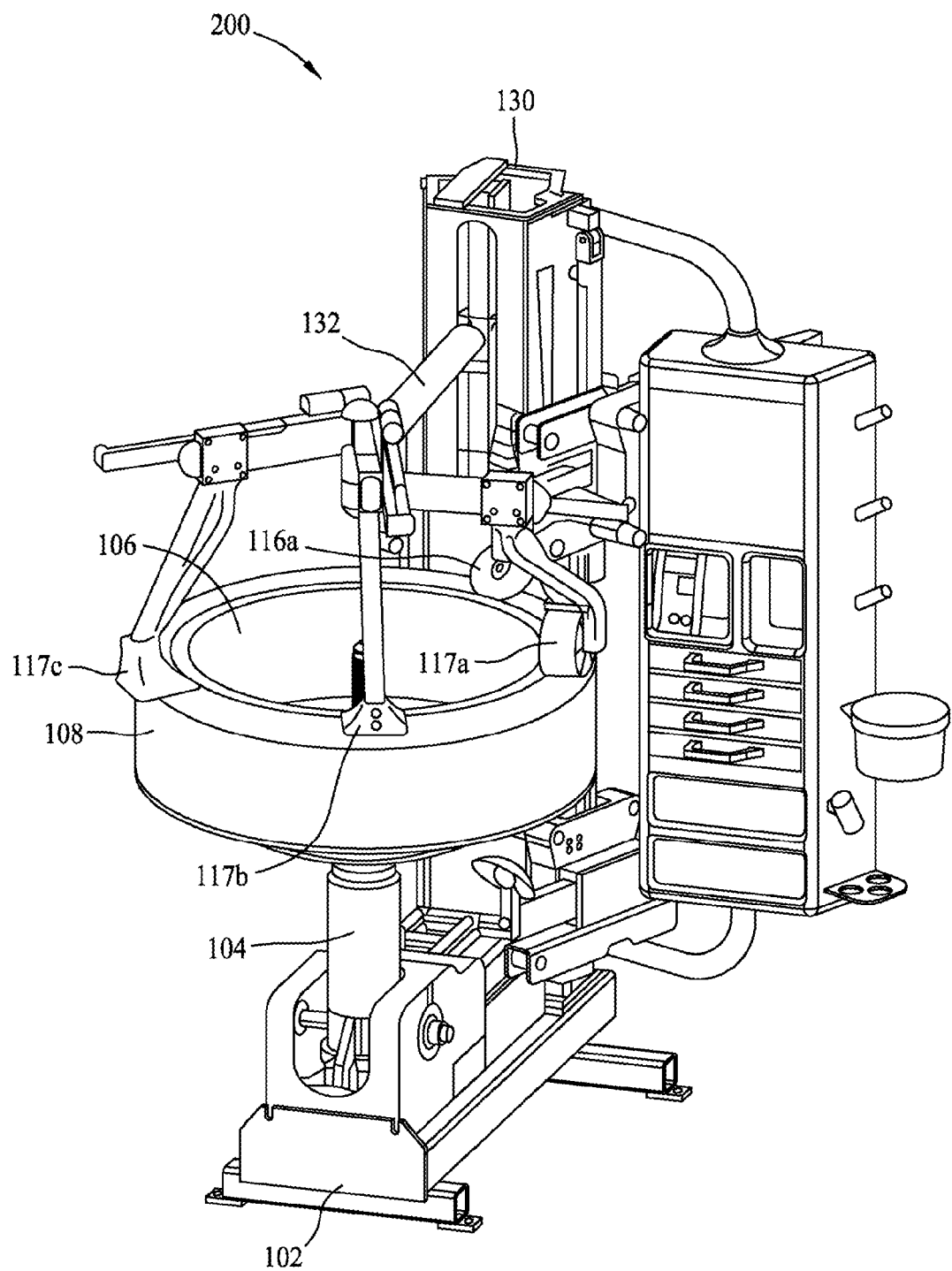
FIG. 14 illustrates another embodiment of a tire changing machine.

FIG. 14 illustrates another embodiment of a tire changing machine 200 that is similar to the machine 100 in all aspects except that the machine 200 includes a third pressing device 117c in addition to the pressing devices 117a and 117b. The pressing device 117c is similar to the pressing devices 117a or 117b described above. The control system 150 (FIG. 2) positions the pressing device 117c similarly to that described for the device 117b.

Figure 15:
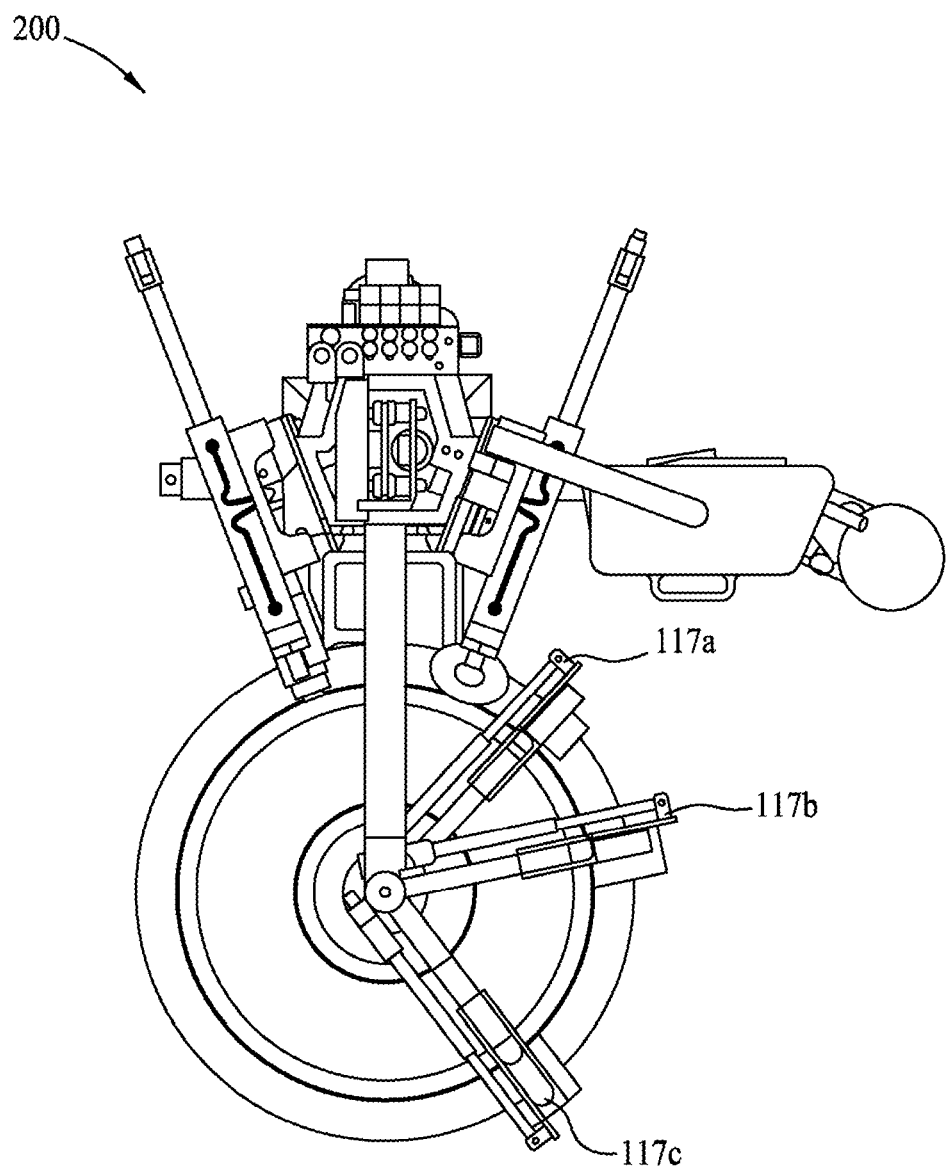
FIG. 15 shows in top view the bead pressing devices in a tire mount mode.
Figure 16:
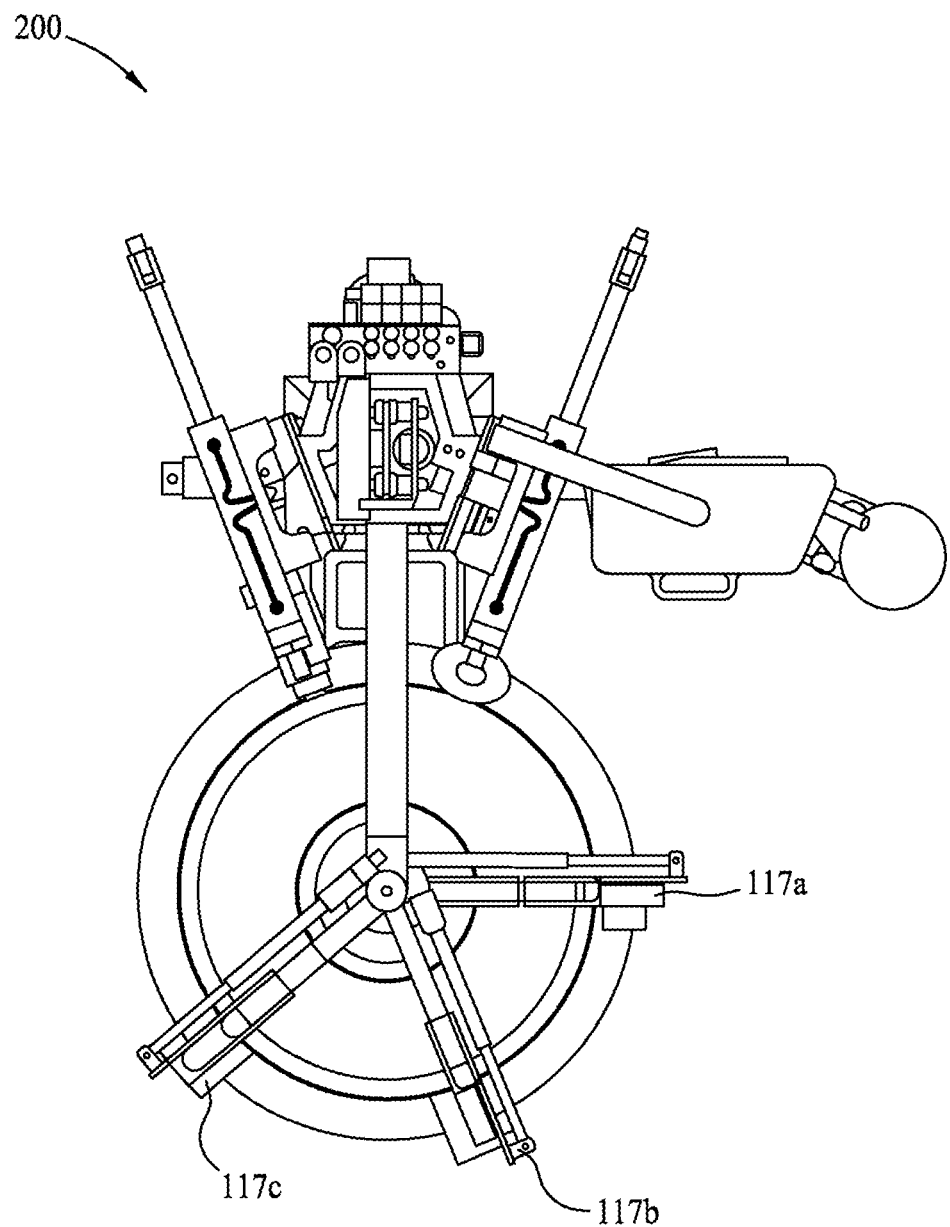
FIG. 16 shows further movement of the bead pressing devices.

FIGS. 15 and 16 illustrate a partial motion sequence of the pressing devices that is similar to that described above, albeit with a third pressing device 117c. The third pressing device 117c provides a third pressure point that may facilitate smoother operation of the machine for certain sizes and types of tires, particularly larger tires having a stiff wall construction.

Figure 17:
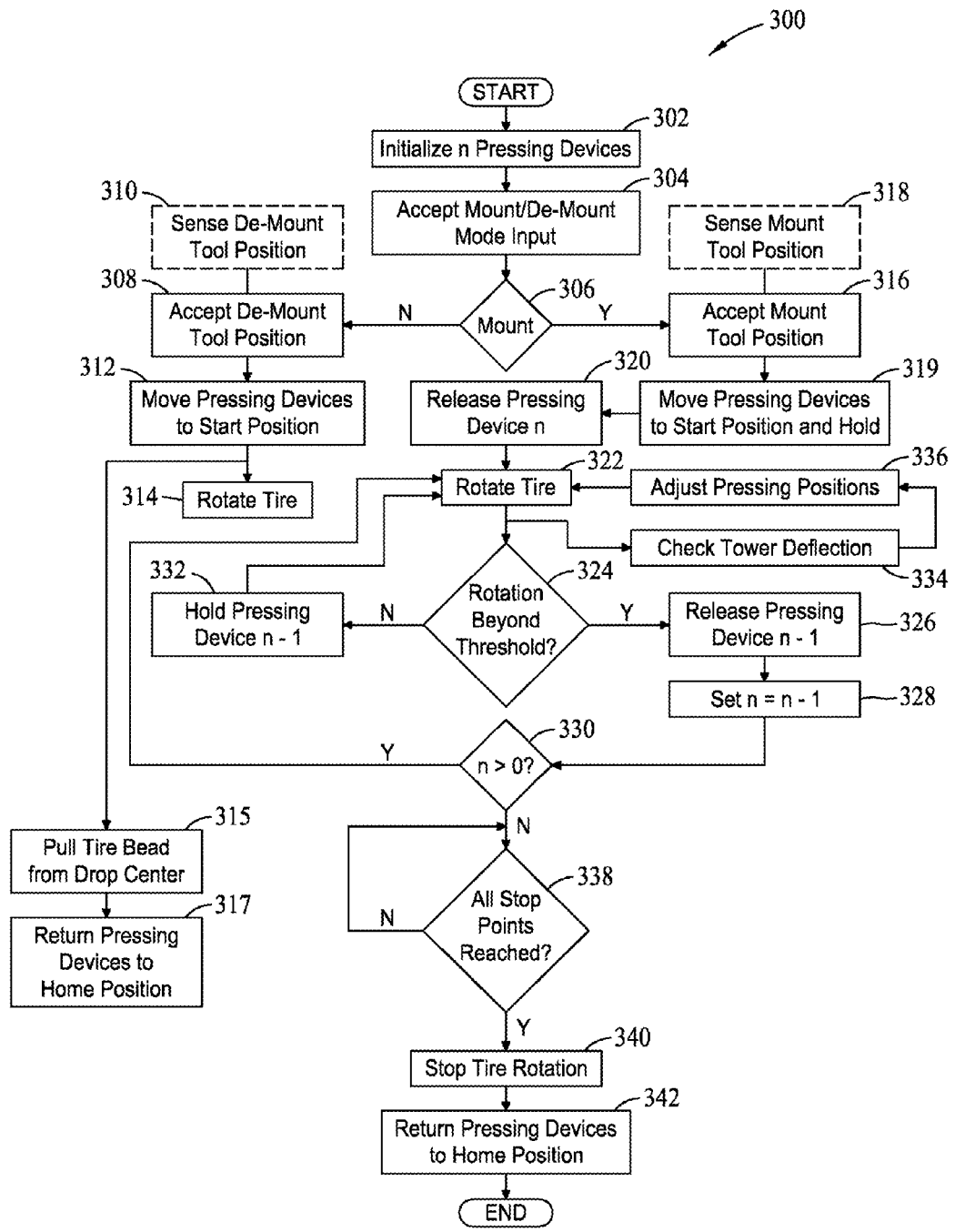
FIG. 17 is a flowchart of an exemplary method processes of performing tire change procedures utilizing the machine shown in the preceding figures.

FIG. 17 is a flowchart 300 of exemplary method processes for changing a tire 108 associated with a wheel rim 106 utilizing the machines 100 or 200 described above, for example, having the drive assembly 104 defining the drive axis 112, a clamping mechanism for engaging the wheel rim 106, and a plurality of bead pressing devices 117 engageable with the tire 108 as described above. The method 300 as illustrated assumes that the tire and associated rim have been previously loaded onto the machine in anticipation of a tire change procedure. The tire and rim assembly may be loaded on the machine in the manner described in the commonly owned U.S. patent application Ser. No. 12/358,760 referred to above that is incorporated by reference in the present disclosure. It is contemplated, however, that other wheel assembly loading and clamping techniques are also known and may likewise be utilized in other embodiments.

As shown in FIG. 17, an exemplary method includes at step 302 initializing the machine with a number of n pressing devices involved in the tire change procedure. Such initializing may be pre-set or pre-programmed in the machine controller 152 in some embodiments, such as in the machine 100 having two pressing devices 117a and 117b where n is preset to two.

Alternatively, the intitializing of n pressing devices may be an accepted input from a machine operator when less than all of the pressing devices provided are to be utilized in a tire change procedure, such as the machine 200 having three pressing devices 117a, 117b and 117c wherein the machine is operable, for example, using only two of the three pressing devices provided on the machine 200. For example, when using the machine 200 the operator could initialize the number n to be equal to two when only the pressing devices 117 and 117b are used with tires of relatively smaller diameters or could initialize the number n to be three when the pressing devices 117a, 117b and 117c are utilized with tires of relatively larger diameter. When user input initialization values are accepted by the machine at step 302, they could be input using any input technique known in the art, including but not limited to use of a switch, pushbutton, lever, touch sensitive panel, mouse, keyboard, or other technologies familiar to those in the art.

Once the number n of pressing devices is initialized at step 302, the machine knows the number of pressing devices involved and the controller 152 can coordinate their position accordingly. Optionally, as part of the initialization at step 302, the n pressing devices may be moved to a home position by the machine controller 152, and the pressing tools can be moved from the home position during a selected tire change procedure as described below.

At step 304, the machine accepts a mode input from the machine operator so that the machine knows the type of procedure being performed and can assist in positioning the pressing devices accordingly. In the example illustrated, the operable modes of the machine include a tire mount mode and a tire de-mount mode. As such, at step 306, the controller 152 determines whether the mount or de-mount mode has been selected. If the de-mount mode has been selected at step 306, the controller accepts 308 an engagement position of the de-mount tool 114. As mentioned above, the de-mount tool may be manually positioned by the operator in a proper position engaging the tire in some embodiments. In such a scenario, once the operator positions the de-mount tool, its position as set by the operator is optionally sensed at step 310 to make its position known to the controller. In other embodiments, the de-mount tool position can be sensed and utilized to automatically position the de-mount tool using known techniques.

The pressing devices 117a, 117b may optionally be used to initially push the tire bead 118 into the drop center 121 of the wheel rim 106 so that the tire bead 118 can be grabbed by the tire bead locating tool 172 (i.e., the mount/demount tool 114 in the tire de-mount mode) without rotating the tire. Once the tire bead 114 has been grabbed, the de-mount tool position is set and the pressing devices 117a, 117b may either be disengaged or allowed to rotate with the tire during a portion of the demount procedure.

Once the de-mount tool position is set, one or more of the pressing devices may be automatically moved 312 by the controller, based upon the de-mount tool position, in directions parallel and/or perpendicular to the drive axis until the de-mount start position such as that shown in FIG. 13 is reached with the pressing devices engaged to the tire sidewall in desired locations. In certain embodiments, all the n pressing devices may be automatically positioned to the start position by the controller 152. In other embodiments, all the n pressing devices may be manually positioned in the start position. Of course, it is also possible that some of the n pressing devices may be manually positioned and some of the pressing devices may be automatically positioned, providing a good deal of flexibility to accommodate a great variety of tire and rim combinations of various sizes, and also user preferences.

Once the start positions of the de-mount tool and the pressing devices are set at steps 308 and 312, the controller may activate the drive assembly and cause the tire to rotate at step 314, either on its own or in response to manipulation of one of the input selectors 110 (FIG. 1). The de-mount tool thus pulls the tire bead from the wheel rim as shown at step 315 while the pressing devices provide downward force at the desired locations to assist with the tire removal process. In another embodiment, once the de-mount tool 114 grabs the tire bead 118 (with one or more of the bead pressing devices 117 pushing the bead 118 into the rim drop center 121 (FIG. 1c)), all the pressing devices 117 may be disengaged from the tire 108 before the drive shaft assembly 104 rotates the wheel rim 106. That is, in some embodiments, the phased motion sequence for the pressing devices 117 as described above may not be utilized in the tire de-mount mode. The tire de-mount procedure may also involve, as shown in FIG. 17 at step 317, returning the pressing devices to the home position.

If the tire mount mode has been selected at step 306, the controller likewise accepts 316 an engagement position of the tire bead locating tool 172 (i.e., the bead breaker tool 116 in the mount mode). As mentioned above, the tire bead locating tool may be manually positioned by the operator in a proper position engaging the tire in some embodiments. In such a scenario, once the operator positions the mount tool, its position is optionally sensed at step 318 to make its position known to the controller. In other embodiments, the locating tool position can be sensed to automatically position the locating tool using known techniques.

Once the tire bead locating tool position is set, one or more of the pressing devices may be automatically moved 319 by the controller in directions parallel to and/or perpendicular to the drive axis, based upon the position of the locating tool, to the mount start position such as that shown in FIGS. 4 and 5 with the pressing devices engaged to the tire side wall in desired locations. In certain embodiments, all the n pressing devices may be automatically positioned to the start position by the controller 152. In other embodiments, all the n pressing devices may be manually positioned in the start position. Of course, it is also possible that some of the n pressing devices may be manually positioned and some of the pressing devices may be automatically positioned, providing a good deal of flexibility to accommodate a great variety of tire and rim combinations of various sizes, and also user preferences.

Once the start positions of the tire locating tool and the pressing devices are set at steps 308 or 312, the $n^{th}$ pressing device is released for rotation at step 320. For the purposes of explaining the method 300, the $n^{th}$ pressing device is the device positioned farthest from the tire bead locating tool in the mount mode. For example, when n is set to two as in the machine 100 described above, the $n^{th}$ pressing device would be the second pressing device 117b as it is farthest from the tire bead locating tool 116 in the start position, and the other pressing device is referred to as the $(n-1)^{th}$ device or the first pressing device 117a. As another example, when n is set to three as in the machine 200 described above the $n^{th}$ pressing device would be the third pressing device 117c, the $(n-1)^{th}$ device would be the second pressing device 117b, and the $(n-2)^{th}$ device would be the first pressing device 117a.

At this point, the controller 152 may activate the drive assembly and cause the tire to rotate at step 322, either on its own or in response to manipulation of one of the input selectors 110 (FIG. 1) by the machine operator. As the tire is rotated, the tire bead locating tool pushes the tire bead into the drop center of the wheel rim while the pressing devices provide downward force at the desired locations to assist with the tire removal process. Because the $n^{th}$ device has been released at step 320, it rotates with the tire either freely or with assistance of a traction point drive element, while the $(n-1)^{th}$ pressing device and any additional pressing device(s) are held in place and prevented from rotating.

As shown at step 324, the controller monitors rotation of the tire and checks whether the predetermined amount of angular rotation has occurred. That is, the controller checks to see whether the tire has been rotated about the drive axis by a predetermined threshold amount such as the amount $\alpha_1$ shown in FIG. 3. If the threshold has been met, the $(n-1)^{th}$ pressing device is released at step 326 and may also rotate with the tire (either freely or with assistance of a traction point drive element), with any additional pressing devices continuing to be held from rotating. At step 328, n is reset to (n−1) and at step 330 it is determined whether n is greater than zero.

If n is greater than zero after being reset at step 328, the controller returns to step 322 and continues to rotate the tire. At step 324, it is determined whether the predetermined threshold of rotation has again occurred, and if so, the $(n-1)^{th}$ pressing device is released at step 326 and rotates with the tire (either freely or with assistance of a traction point drive element). Because the number n has been reset, the $(n-1)^{th}$ pressing device is different from the device previously released such that the pressing devices are being released in sequence as previously described. The number n is again reset at step 328 and it is determined whether n is greater than zero at step 330. If n is greater than zero the method returns to step 322 and the cycle continues.

If at step 324 it is determined that the threshold amount of rotation has not occurred, the $(n-1)^{th}$ pressing device is held in place at step 332 and prevented from rotating with the tire, while the tire continues to be rotated at step 322. Only when the threshold amount of rotation has occurred will the $(n-1)^{th}$ pressing device be released. Again, because the number n is reset with each pass through the loop, the pressing devices are selectively held and released in sequence as demonstrated in the examples described in relation to FIGS. 3 through 12. The holding and releasing of the pressing devices may be accomplished using any of the exemplary techniques described above, or familiar to those in the art.

Optionally, at any time during the procedure the controller may check the tower deflection 334 as described above, and if necessary, adjust the position of the tools and pressing devices as shown at step 336 to compensate for deflection of the tower.

If at step 330 n is determined to be zero, all of the n pressing devices have been released, and the controller determines whether all of the n pressing devices have reached their stopping points at step 338. If not, the tire continues to be rotated. If all the stopping points for the n pressing devices have been reached at step 340, the tire rotation may be ceased at step 342.

The method 300 may be implemented, for example, as a control algorithm for the machine controller. It is believed that appropriate software could be programmed to execute the method without further explanation.

While exemplary method processes have been described, it is understood that variations are possible without departing from the scope and spirit of the invention. Such variations may include omitting certain steps shown in FIG. 17, changing the order of the steps shown in FIG. 17, and adding additional steps beyond those shown in FIG. 17.

With regard to omitting steps shown in the method 300, it is recognized that with different configurations of the machine certain of the steps may not apply. For instance, when holding and releasing of the pressing devices is accomplished using mechanical cam arrangements and the like, the steps of initializing the number n, resetting the number n, and determining whether n is greater than zero may be partially or completely obviated, while in an electronic control scheme for holding or releasing the pressing devices such steps may be central to the control scheme. As another example, step 304 wherein the mount/de-mode selection is presented may be considered entirely optional in some embodiments, especially when the control scheme is partly reliant on operator positioning of the tools involved in the tire change procedure. As still another example, the tower deflection compensation associated with steps 334 and 336 may be entirely omitted in some embodiments.

With regard to additional steps that may be desirable in the method 300, among the contemplated possibilities include prompting the machine operator for steps necessarily performed by the operator, and providing feedback to the operator for steps being performed automatically by the machine. In such embodiments, the machine may interact with the operator and guide the operator through the tire change procedure. In embodiments where operator input is minimal or non-existent, the machine may nonetheless provide informational feedback to the operator concerning aspects of the procedure, and whether or not they have been successfully performed.

It is also contemplated that the method may include detection of error conditions, and associated notification to the machine operator, perhaps with explanation and instructions for the operator to respond.

Automated tire change procedures may be further facilitated in some embodiments by storing successful position profiles for the pusher devices in memory of the machine controller or another element, and using the stored profiles for purposes of the steps 308 and 312 in the de-mount mode, or steps 316 and 319 in the mount mode.

Figure 18:
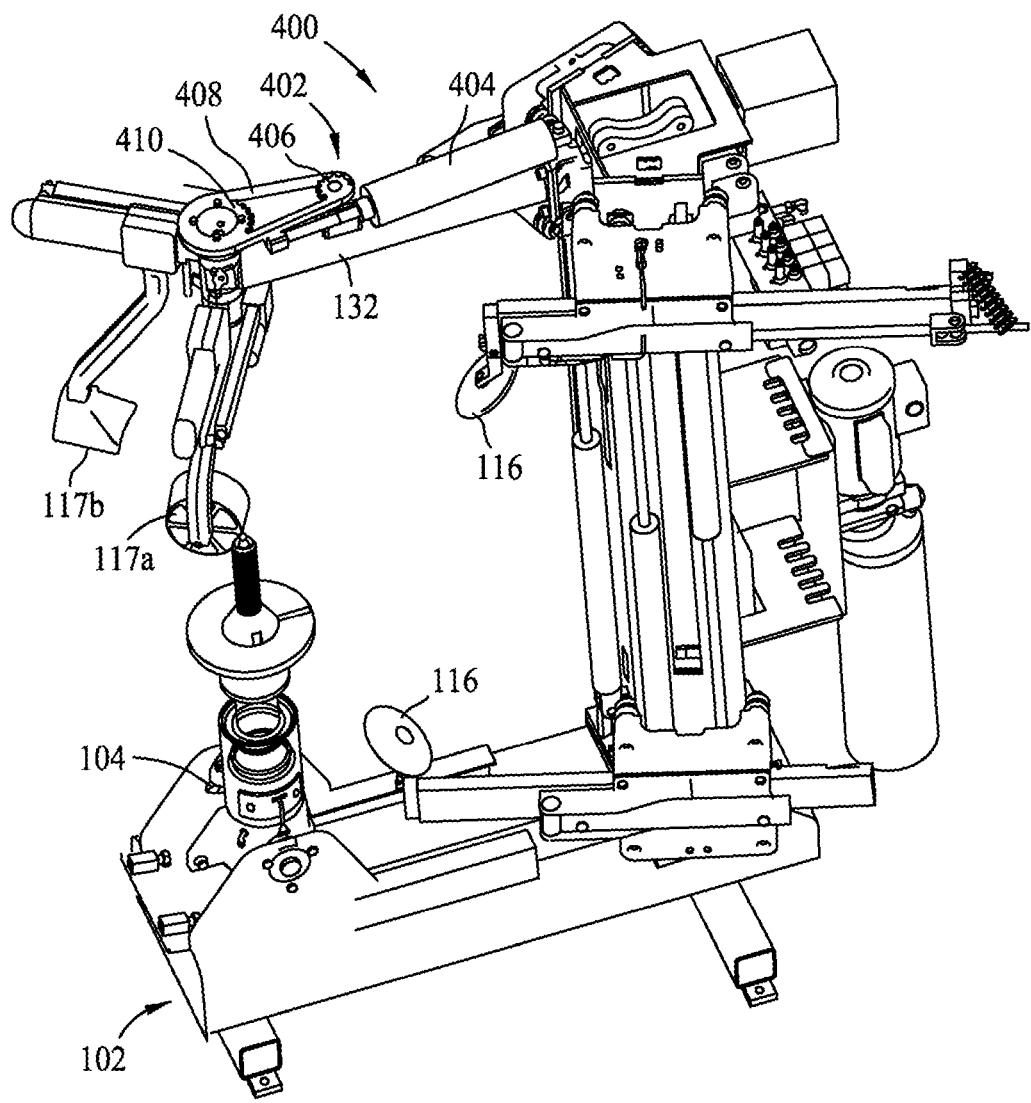
FIG. 18 is a perspective view of another exemplary embodiment of a tire changing machine.
Figure 19:
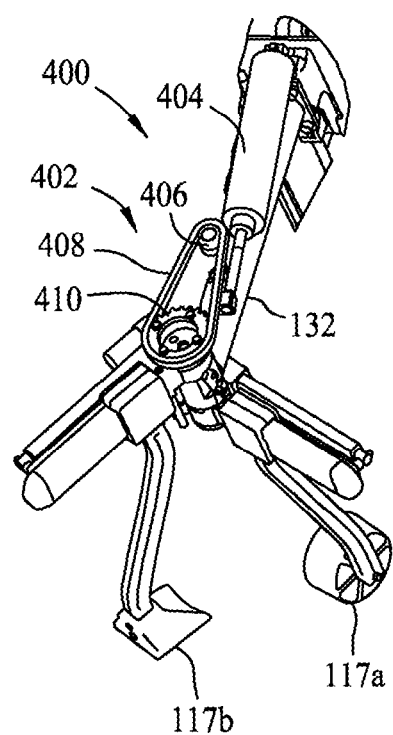
FIG. 19 is a perspective view of a first exemplary traction point drive assembly for the machine shown in FIG. 18.
Figure 20:
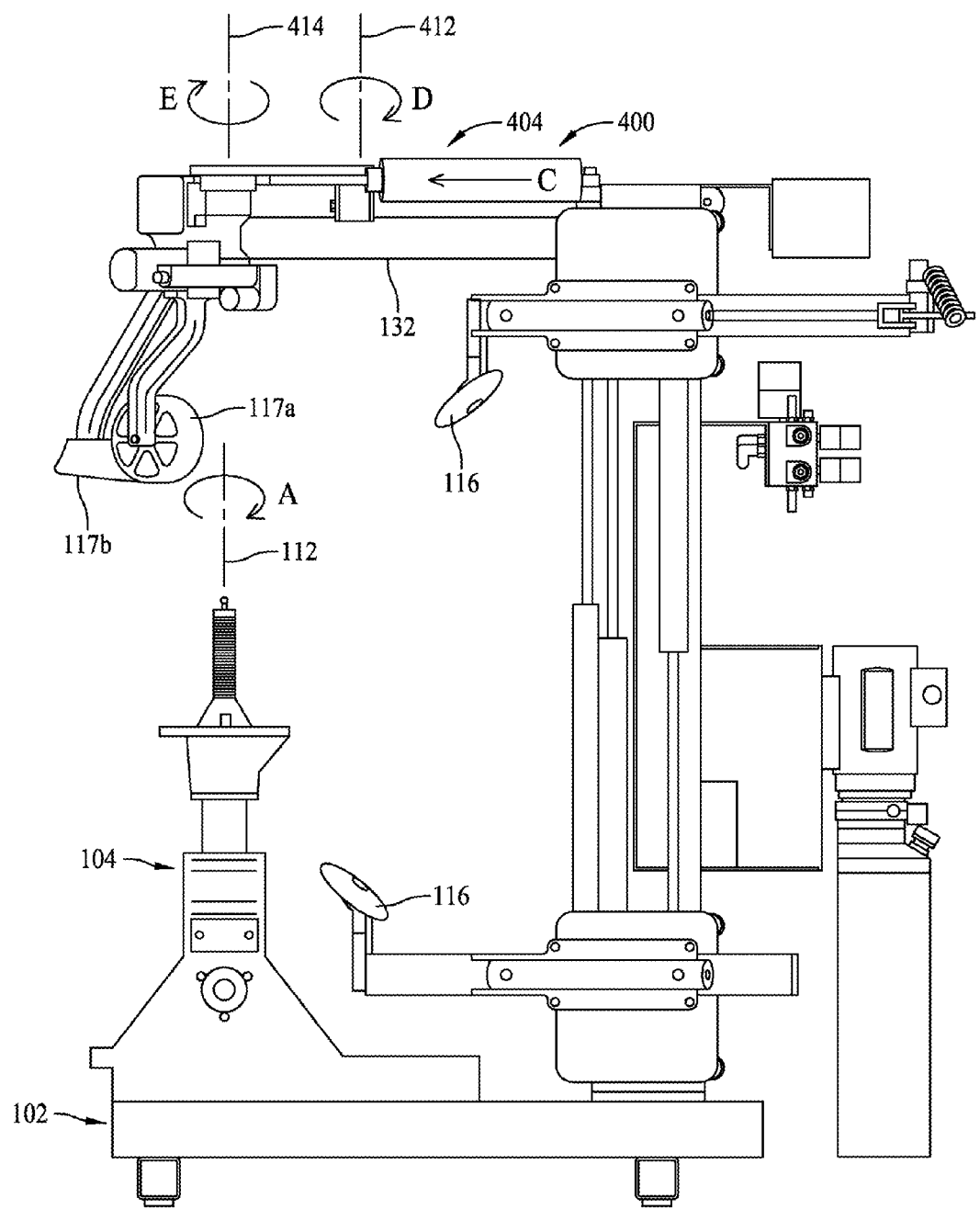
FIG. 20 is a side elevational view of the machine shown in FIG. 18.

FIGS. 18-20 illustrate further features of a tire changing machine similar in most aspects to the machines 100 and 200 described above, and including an exemplary traction point drive mechanism 400 (shown separately in FIG. 19) coupled to the pusher devices 117a and 117b.

In the example shown, the traction point drive mechanism 400 includes an output drive assembly 402 and a linear actuator 404 mechanically coupled thereto. The output drive assembly 402 in the exemplary embodiment shown includes first rotary sprocket 406, a link 408 coupled to the sprocket 406 and interfacing with a second rotary sprocket 410. The sprocket 410 is, in turn coupled to and carries the rotationally mounted carriage for the bead pressing devices 117.

In various embodiments, the linear actuator 404 may be a known pressure cylinder (e.g., hydraulic or pneumatic) or electric cylinder having a movable, reciprocating piston or ram. The linear movement of the ram in the direction of Arrow C (FIG. 20) causes the sprocket 406 to move rotationally about a rotational axis 412 in the direction of Arrow D (FIG. 20) that is spaced from, but parallel to the machine drive axis 112 as shown in FIG. 20. As those in the art would no doubt appreciate, there are various ways that the motion of the linear actuator 404 may be converted to rotational movement of the sprocket 406. As one example, but not necessarily the only example, the sprocket 406 may be a pinion gear coupled to a rack (not shown) that is linearly movable with the actuator 404.

The linear actuator 404 extends to move the link 408. This causes rotation of the sprockets 406 and 410 about an axis 414 spaced from, but generally parallel to the axis 412. When the axis 414 is aligned with the machine drive axis 112 as shown in FIG. 20, the pressing devices 117a and 117b can be rotated with the tire 108 (FIGS. 1a, 1b, 1c) while the rim 106 is rotated about the drive axis 112. Alternatively stated, when the axes 414 and 112 are aligned, the axis 414 effectively becomes an extension of the axis 112 such that the pressing devices 117a and 117b are rotationally movable about the axis 112 with the tire 108, while the wheel rim 106 is driven about the axis 112. In different embodiments, the link 408 may be a chain, a belt, or other known linkage elements with similar effect.

Referring to FIGS. 19 and 20, when the linear actuator 404 produces linear movement in the direction of arrow C, the sprocket 410 is caused to move rotationally about the axis 414 in the direction of arrow E by virtue of the actuator 404 displacing the link 408. The movement of the sprocket 410 causes the pressing devices 117a and 117b to move rotationally about the axis 414, which may be positioned to coincide with the drive axis 112. By virtue of the mechanism 402, the bead pressing devices 117a and/or 117b may establish a traction point with the tire 108 as it is rotated in the direction of arrow A (also shown in FIGS. 3, 5, 8 and 10-13). The actuator 404, through the sprockets 406 and 410 and the link 408, provides a rotational force to the pressing devices 117b and/or 117a as they are released in the phased motion sequence described above. The rotational force allows the pressing devices 117b and/or 117a to rotate the tire 108 and ensure that relative rotation between the tire 108 and the wheel rim 106 does not occur.

In the exemplary embodiment shown, the output drive assembly 402 includes sprockets 406, 408 interfacing with a chain link 408. The chain link 408 is driven or displaced by the actuator 404 to cause rotation of the sprocket gears 406, 410 with the actuator 404 as described above. Alternatively, one of the sprockets 406, 408 could be directly driven with a rotary actuator in another embodiment. That is, for example, one of the sprockets 406, 408 could be directly driven or actuated to cause rotation thereof with the rotation of one of the sprockets 406 or 408 causing the chain link 408 and the other sprocket to rotate. Moreover, in an embodiment wherein a rotary actuator is utilized, it is contemplated that the link 408 may not be necessary at all, and a direct drive arrangement may result to cause the pressing devices to rotate.

While the sprocket and chain arrangement illustrated is believed to be beneficial, it is recognized that other equivalent drive train configurations are possible. For example, belt and pulley combinations may likewise be used with similar effect. Likewise, gears may be provided with or without a link to provide similar rotational effects for the pressing devices. Regardless of the actuator input to the traction point drive mechanism 400 or the drive output elements involved in the assembly 402, the rotational output of the pressing devices 117a, 117b may be substantially the same. As such, while exemplary embodiments have been described, it is recognized that numerous mechanical linkages and arrangements, as well as actuation schemes, are possible to provide comparable functionality and benefits as described herein.

Using the traction point mechanism 400, a reliable traction point can be established with the pressing devices 117 at rather low cost. Human operators need not exert any force to establish a tracking point, and a more pleasurable and safe working environment for the operator may result.

Additionally, in contemplated embodiments the linear actuator 404 need only turn the sprocket 410 by a small amount to establish the traction point, with the actuator 404 being disengaged from the assembly 402 thereafter. That is, the actuator 404 may be effectively used only to start rotation of the pressing devices 117 while engaged to the tire 108. After the rotation is started, the actuator 404 is disengaged and the sprocket 410 may freely rotate with the tire 108 as the wheel rim 106 is rotated by the drive shaft assembly 104. In such a case, the bead pressing devices 117 may naturally assume the rotational speed of the drive axis 112, whatever it happens to be. The fraction point drive mechanism 400 therefor need not necessarily rotate the sprocket 410 at the same rotational speed as the drive shaft assembly 104 rotates the wheel rim 106 about the drive axis 112 to effectively create a traction point. Control schemes for actuating the traction point mechanism 400 are therefore simplified in comparison to other embodiments using, for example, rotary actuators such as motors to establish a traction point.

From a controls perspective, the linear actuator 404 need only be activated at or near the same time as the drive shaft assembly 104 is activated to establish the traction point. In different embodiments, the linear actuator 404 may be activated slightly before or after the drive shaft assembly is activated to smoothly establish the traction point. Simultaneous activation may also be possible for the drive shaft assembly 104 and the linear actuator 404, but likely would present more logistical issues and perhaps require compensation features to account for differences in the different types of actuation involved. In any event, rather complicated electronic control schemes that may otherwise be required can largely be avoided using the drive output assembly 402 and the linear actuator 404.

While an exemplary traction point mechanism 400 has been shown and described, other arrangements and configurations are possible and could also be used within the scope and spirit of the invention.

Figure 21:
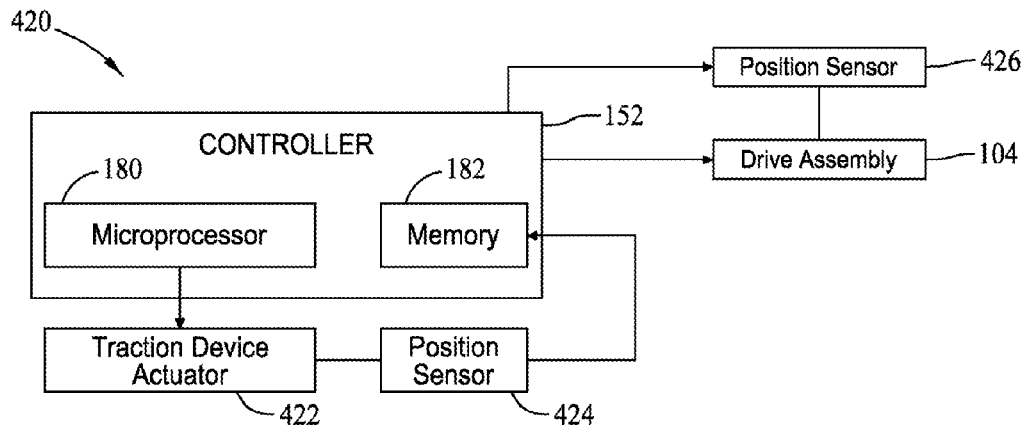
FIG. 21 illustrates further aspects of the control system shown in FIG. 2.

FIG. 21 illustrates further aspects of a control system, and more specifically a closed loop control system for operation of the traction point drive mechanism, such as the traction point drive mechanism 400 (FIGS. 18-20). Closed loop control of the traction point drive mechanism 400 provides certain advantages over open loop controls insofar as the traction point drive mechanism 400 is concerned.

The Applicants have learned that open loop controls for the traction drive mechanism 400 presents practical difficulties. It has been proposed, for example, in an open loop control scheme to rely entirely on timing considerations to effect the operation of the pusher devices. As such, the actuator 404 may be actuated for a certain period of time to position the pusher devices in desired start positions for a tire mount or de-mount procedure. In other words, by powering the actuator 404 for a certain period of time, the change in position of the pusher devices while the actuator 404 is powered can be inferred, assuming a relatively constant rate of actuation that drives the rotational speed of the traction point drive mechanism. The rate of actuation in any given implementation can be controlled or empirically determined, and once such an open loop control system is calibrated it can work reasonably well.

A problem that has been encountered, however, is that the actual rate of actuation can vary among different traction point drive mechanisms and amongst different machines, even if substantially identically constructed. Some traction point drive mechanisms have been found to operate at increased and decreased speeds relative to otherwise similar traction point drive mechanisms. Because of such variation, timing considerations for open loop feedback controls can be compromised. For faster operating mechanisms, any predetermined time period of actuation for the pusher devices 117 to reach the desired start position in a tire mount procedure may be too long. For slower operating machines, the predetermined actuation time may be too short for the pusher devices 117 to reach the desired start position in a tire mount procedure. Undershoot and overshoot of the actual start positions relative to the desired start positions of the pusher devices 117 may therefore result. Adopting a timing protocol that will work universally amongst different machines is therefore difficult, while specifically calibrating each machine to account for unique operating characteristics is impractical.

Stop features can be built into the traction point drive mechanisms to prevent overshooting of desired tool positions, although at additional expense. The most practical way to address undershooting of desired tool positions in an open loop control system is to set the actuation time period for longer than typically would be needed so that slower operating traction point drive mechanisms have additional time to bring the pusher devices 117 to the desired start position. However, extending the actuation time in such a manner may result in awkward delays in operation of the machine. The pusher tools 117 may have reached their desired start positions, but the machine cannot perform another step in the procedure until the actuation time has expired. In such instances, efficient use of the machine is impaired.

Similar problems have been observed in locating the pusher tools 117 in their desired start positions on a tire for a de-mounting procedure. In tire de-mount operations, the pusher tools 117 should be positioned roughly opposite the demount tool 114 as explained above. Pure timing techniques for open loop controls, however, are subject to the difficulties mentioned above, namely overshoot and undershoot of the desired tool starting positions due to variations in operating speed of the traction point drive mechanisms. Whether in mounting or de-mounting operation, undesirable variations in machine performance may result from undershoot and overshoot of the pressing device tools relative to the desired start positions. If the pressing device tools 117 are not in the proper place, the successful completion of the tire change procedure may be compromised. The pusher devices 117, if not correctly positioned, may also contact and damage TPMS sensors and the like.

Still another problem has been observed with open loop feedback controls of the traction point drive mechanism 400. When the tire 108 is successfully de-mounted from the wheel rim 106, the tire 108 falls into the drop center 121 (FIG. 1c) of the wheel rim 106. As the tire 108 descends into the drop center 121, the pusher tools 117 lose contact with the tire sidewall, and a practically uncontrollable rapid acceleration of the pusher tools 117 may occur. That is, the pusher tools 117 may suddenly accelerate as contact with the tire is lost, and because the pusher tools 117 may not have far to travel to their hard stop end positions when this occurs, they can hit the end positions with noticeable force. This result can be unexpected and somewhat jarring, if not disturbing, to machine operators. It could also potentially damage the pusher tools 117, the traction point drive mechanism 400, or other machine components.

To solve these problems, and as shown in FIG. 21, a closed loop feedback control system 420 is provided that offers a more precise control that is more effectively repeatable for uniform operation across a number of machines. In the embodiment shown, the control system 420 is an extension of the control system 150 (FIG. 2) and thus includes the controller 152 including the processor 180 and memory 182 as described above.

The controller 152 is interfaced, as shown in FIG. 21, with a traction drive actuator 422, which may correspond to the actuator 404 (FIGS. 18-20, or one or more of the motors 162, 164, 166 (FIG. 2) associated with a traction point drive as also discussed above. A position sensor 424, such as an encoder or other known position detecting element familiar to those in the art, provides a feedback control signal to the controller 152 regarding an actual rotational position of the traction point drive, and by implication the rotational position of at least one of the pusher tools 117 associated therewith. If the sequenced release of the pusher tools 117 as described above is implemented, only one of the tools 117 will be allowed to rotate at the beginning of the procedure. Thereafter, multiple pusher tools 117 may rotate in unison. It is recognized, however, that the closed loop feedback control does not necessarily require the sequenced release of multiple pusher tools 117.

The position sensor 424 in one exemplary embodiment may be physically associated with second rotary sprocket 410 (FIGS. 18-20) or another rotatable component of the traction point drive mechanism 400. In an embodiment wherein the traction point drive mechanism is actuated with a rotary actuator such as a motor, the position sensor may be physically associated with the motor. Numerous variations are possible to implement the position sensor 424 in various locations on the machine. The position sensor 424 may also be directly associated with a pusher tool 117, as opposed to indirect sensing of a pusher tool location via sensing a position of a drive mechanism, which may be the traction point drive mechanism described above or another drive mechanism capable of positioning the pusher tools 117. Sensing of a rotational position of a pusher tool 117 may accordingly be used for purposes other than operation of a traction point drive mechanism. That is, the sensor 424 may be utilized for control feedback purposes even for machines that do not include a traction point drive mechanism.

Using feedback from the position sensor 424, the position of the pusher tools 117 can be monitored and coordinated with closed loop feedback controls. The position sensor 424 allows accurate positioning of the pusher tools 117 to their mount and de-mount start positions with minimal time, regardless of the actual operating speed of any traction point drive mechanism. Undershoot and overshoot of desired tool start positions is avoided, as well as undesirable delays in machine operation that may result from open loop controls reliant upon pure timing considerations as described above. The pusher tools 117 are reliably put into position in much less time relative to a similar machine having open loop controls, and the machine is able to continue to the next step of the procedure much more quickly than is otherwise typically possible using open loop controls. Convenient and efficient use of the machine is accordingly enhanced.

In an exemplary embodiment, and as also shown in FIG. 21, the controller 152 may be further interfaced with the drive assembly 104 of the machine, and a position sensor 426 that may also be an encoder or other position detecting element known in the art. The position sensor 426 provides a feedback signal allowing the controller 152 to determine a rotational position of the drive assembly 104 in use. The controller 152 accordingly has real time knowledge of the position of the drive assembly 104 to which the wheel rim 106 is mounted, and real time knowledge of the position of the traction point drive mechanism 400 that carries the pusher tools 117. Ideally, the rotation of the wheel rim 106 as driven by the drive assembly 104 and the rotation of the pusher tools 117 as carried by the traction point drive mechanism 400 are exactly the same so that the pusher tools 117 start in a desired position and remain in desired positions as the tire is rotated when the mount or de-mount procedure commences and continues to successful completion.

By comparing the feedback signals of the position sensor 426 of the drive assembly 104 with the position sensor 424 of the traction point drive actuator 422, deviations between the actual and desired position of the pusher tools 117 relative to the wheel rim 106 may be detected. Some deviation may be allowable, and may even be expected in actual implementation, but when the detected deviation crosses a predetermined threshold the controller may intervene and respond to correct any undesirable deviation. The type of deviation may further inform the controller 152 to make control decisions as to specifically what action corrective action is needed.

For example, a deviation between pusher tool position and wheel rim position may be the result of a successful tire de-mount procedure and a subsequent loss of contact between the pusher tool(s) and the tire sidewall as discussed above. This is sometimes referred to as a runaway pusher tool condition. In such a case, the controller 152 may detect such a runaway condition and prevent a rapid acceleration of the machine tools 152. Specifically, and as one example, when the traction drive actuator 422 is a double acting cylinder such as the actuator 404 shown in FIGS. 18-20, the controller can prompt a reversal in the direction of actuation to provide a braking force that quickly and smoothly brings the runaway tool(s) to a stop.

Another possible cause of a deviation between the wheel rim position and the pusher tool position may be one or more of the pressing tools 117 sliding on the tire sidewall. The controller 152 may be configured to recognize such a condition and take corrective action such as slowing down the rotation of the drive axis to reduce the deviation, and/or perhaps apply more downforce to the pusher tools 117 to prevent them from any further sliding.

By monitoring the feedback signals from the sensors 424 and 426, the controller 152 may distinguish between different types of deviation having different underlying causes and specifically respond to detected deviations as described below.

Figure 22:
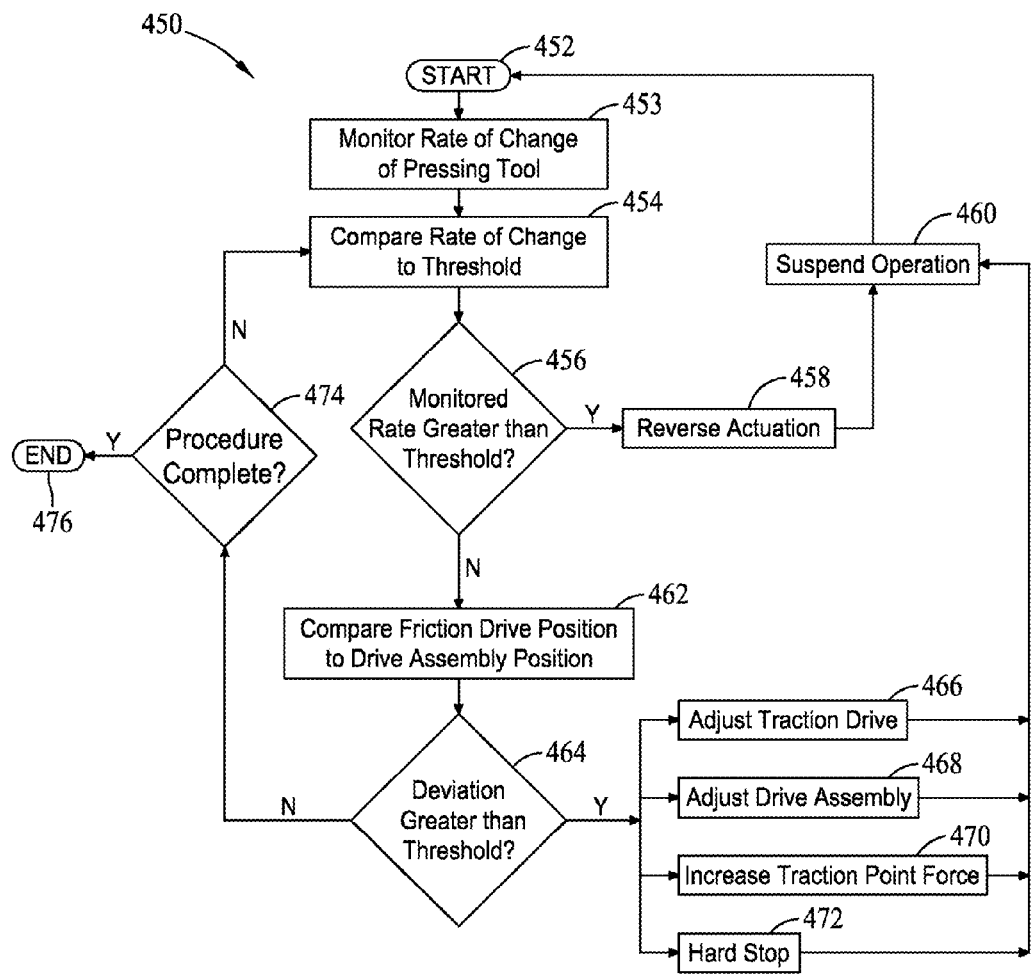
FIG. 22 illustrates an exemplary control algorithm executable by the control system shown in FIG. 21.

FIG. 22 illustrates an exemplary control algorithm 450 executable by the control system 420 shown in FIG. 21 and illustrating one potential implementation of the concepts described. At step 452 the algorithm starts, and it is assumed for the present discussion that at this point the wheel rim has been properly mounted and clamped to the machine drive assembly 104, that the operator has selected the applicable mount or de-mount modes of operation if applicable, and that the pusher tools 117 have been placed in the appropriate start positions for the mode selected. Thus, for the purposes of the present discussion, the step 452 represents the beginning of rotation of the wheel rim as driven by the drive assembly, and also the beginning of rotation of the leading pusher tool (i.e., the pusher tool 117 in the exemplary embodiments shown in FIGS. 18-20).

At step 453 a rate of change of position of the pusher tool and particularly the lead pusher tool 117b is monitored utilizing the feedback signal from the traction drive position sensor 424 (FIG. 21). Monitoring of the rate of change of the pusher tool position addresses the runaway pusher tool problem when the tire falls into the drop center of the wheel rim as discussed above. It is expected that the rate of change will increase rapidly from zero to a nearly constant level as the pusher tool is brought up to rotational speed from a stopped position. If a sudden increase in the rate of change in position over time (i.e., rotational speed) is thereafter detected with the position sensor 424, this is an indication that the runaway tool condition is occurring.

Therefore, as shown at step 454, the rate of change of the pusher tool position is monitored and compared to a predetermined threshold. If at step 456 the monitored rate of change exceeds the predetermined threshold, the controller may take corrective action such as reversing the actuation of the traction drive actuator 422 (FIG. 21) as shown at step 458 to counteract the acceleration of the pusher tool, or suspending further operation of the machine as shown at step 468 to avoid undesirable consequences. As step 460, operation of the traction drive may be shut down so that the lead pusher tool is no longer able to move, and the drive assembly 104 may further cease to rotate. Once operation is suspended at step 460, optional alarm conditions may be set and displays presented for the operator with explanation of what has occurred. The operator can inspect and then restart at step 452.

In various embodiments, the predetermined threshold for the purposes of steps 454, 456 may be relative or absolute. As an example of a relative threshold, the threshold may be set such that when the rate of change increases by x percent from a nearly constant level after the pusher tool is brought up to speed a runaway tool position is detected, with x being chosen to represent a sufficient increase in speed from the constant level that strongly indicates a runaway pusher tool condition. As an example of an absolute threshold, the threshold may be set at a level y that is chosen to represent a rate of change that likely corresponds to a runaway tool condition, but is independent of the constant level of change in position once the pusher tool is brought up to speed. As such, a relative threshold may "float" upward or downward with variations in the actual rotational speeds of different machines, while the absolute threshold will be constant across different machines. Threshold values for x and y may be calculated or empirically determined, and are strategically selected for optimal operation of the machine. In certain contemplated embodiments, it is contemplated that the controller 152 may utilize both relative and absolute thresholds and react to whichever is encountered first. The threshold value(s) or related parameters to determine the thresholds may be stored in the controller memory 182 (FIG. 21) and retrieved as needed.

Regardless of the number and nature of the thresholds that are set, it is possible that the controller 152 can react nearly instantaneously to a runaway tool pusher problem via steps 453, 454, 456 and 458 such that it may become virtually transparent to the user. That is, the machine operator may not see, feel or appreciate this feature of the machine as it controls runaway tool conditions. Either the controller 152 may operate the actuator 422 to counteract acceleration of a runaway pusher tool, or it may suspend machine operation before the acceleration of the pusher tool reaches an undesirable level. Either way, the pusher tools are brought to a stop without jarring impact that may otherwise result if the acceleration of the pusher tool was not mitigated. A more pleasurable operator experience is therefore ensured.

It is noteworthy at this point that nearly identical runaway pusher tool conditions may result in a tire mount procedure when the tire is completely mounted, and the controller 152 may monitor and react to such conditions in the tire mount mode in an identical manner at steps 453, 454, 456, 458 and 460. Thus, while the pusher tool start positions may be different in the mount and de-mount modes, the algorithm 450 does not necessarily depend on whether the mount or de-mount mode has been selected. In a further and/or alternative embodiment, different thresholds may be utilized in different modes of operation.

It is further noted that detection of the runaway pusher tool condition as described thus far does not necessarily require the position sensor 426 (FIG. 21) of the drive assembly 104 to implement. Rather, steps 453, 454, 456, 458 and 460 could be implemented using only the position sensor 424 associated with the traction point drive mechanism. In another embodiment, however, the controller 152 may provide otherwise similar functionality but using both the position sensor 424 associated with the traction point drive mechanism and the position sensor 426 associated with the drive assembly 104. In such an embodiment, the rate of change in position of the drive assembly 104 via the sensor 426 may be compared to the rate of change in position of the traction point drive mechanism via the traction drive actuator 422 and the position sensor 424. A rapid increase in the rate of change of the traction point drive mechanism relative to the rate of change of the drive assembly can be taken as an indication of a runaway tool condition.

Continuing with the exemplary algorithm 450 shown in FIG. 22, if the monitored rate of change at step 456 is less than the threshold, the controller 152 compares at step 462 the traction drive position via the sensor 424 to the drive assembly position via the sensor 426. When a deviation in these respective positions reaches a threshold amount as shown at step 464, the controller may react to the detected deviation to ensure successful completion of the tire mount or de-mount procedure.

As example, when the detected deviation between the drive axis position and the traction point drive position exceeds the threshold amount, the actuator 422 (FIG. 21) for the traction point drive mechanism may be adjusted as shown at step 466 to increase or decrease its speed to reduce the deviation to a level below the threshold. More specifically, when the traction drive actuator 422 is a linear actuator such as the actuator 404 (shown in FIGS. 18-20) the cylinder may be pulsed faster or slower to change the speed of the traction drive and the pusher tool 117b and bring it back into a tolerance range of position relative to the wheel rim as determined by the rotational position of the machine drive axis. In particular, if the pusher tool 117b is found to be leading the position of the wheel rim 106 as determined by the drive assembly 104, the pusher tool 117b can be slowed down by adjusting the rotational speed of the traction drive assembly to a reduced speed as shown at step 466. As the speed of the traction drive assembly is reduced, the pusher tool position and the drive assembly position can be returned to or below the threshold utilized for the purposes of step 464.

Likewise, as shown at step 468, the rotational speed of the drive assembly 104 can be adjusted to reduce a detected deviation between the traction drive position (which dictates the pusher tool position) and the position of the drive axis (which dictates the position of the wheel rim). For example, if the pusher tool 117b is found to be lagging the position of the wheel rim 106 as determined by the drive assembly 104, the drive assembly can be slowed down at step 468. Likewise, if the pusher tool 117b is found to be leading the position of the wheel rim 106 as determined by the drive assembly 104, the drive assembly can be sped up as shown at step 468.

As further shown at step 470, the controller 152 can also adjust the downforce applied by the pusher tool on the sidewall of the tire. This may be especially advantageous if the lead pusher tool is sliding on the tire sidewall, causing the pusher tool position to lag the drive axis position. Generating additional downforce with the pusher tool may establish a firmer fraction point and eliminate further sliding. Adjustment of the tool position at step 470 can be further coordinated with adjustment of the traction drive at step 466 and adjustment of the drive assembly at step 468.

Instances where the pusher tool position leads or lags the drive axis beyond a predetermined amount should in particular be avoided to ensure that the pusher tool does not extend too close to other components of the machine, and thus the controller 472 may initiate a hard stop or shut down of machine operation when deviations between the drive axis position and the pusher tool position exceeds certain thresholds.

The thresholds utilized at step 464 may be absolute or relative as discussed above. More than one threshold may be used, and in particularly the threshold for the hard stop of step 472 may be higher than the thresholds causing the corrective action at steps 466, 468 and 470. The use of multiple thresholds may be considered optional, and a single threshold may suffice. Also, some or all of the corrective steps 466, 468 and 470 may be considered optional in certain embodiments, and the machine can simply suspend operation at step 460 and prompt the operator for inspection.

If any detected deviation between the drive axis position and the traction drive position is below the threshold at step 464, at step 474 it is ascertained whether the mount or de-mount procedure is complete. This can be a time-based or position-based determination in different embodiments. For example, if the traction drive has not been rotated a sufficient amount to return the lead pusher tool to its end position, the procedure may be deemed incomplete, and the controller 152 returns to step 453 and continues to monitor the rate of change of the pusher tool. In a time-based system, if a predetermined amount of time has not expired, the procedure may be deemed incomplete, and the controller 152 returns to step 453 and continues to monitor the rate of change of the pusher tool. If the procedure is determined to be complete, the algorithm ends as shown at step 476 and the controller 152 returns to a main control loop.

As now should be evident, the algorithm 450 allows the controller 152 to actively control the tool position as a tire mount and de-mount procedure continues. The controller 152 can make adjustments to address different problem conditions, and may do so repeatedly until the procedure is successfully completed. Little or no operator input is required unless and until machine operation is stopped or suspended at steps 460 or 472. The control system 420 and algorithm therefore facilitates convenient automation of tire mount and de-mount procedures, and improves efficiency of the machine by completing procedures in optimal amounts of time.

Figure 23:
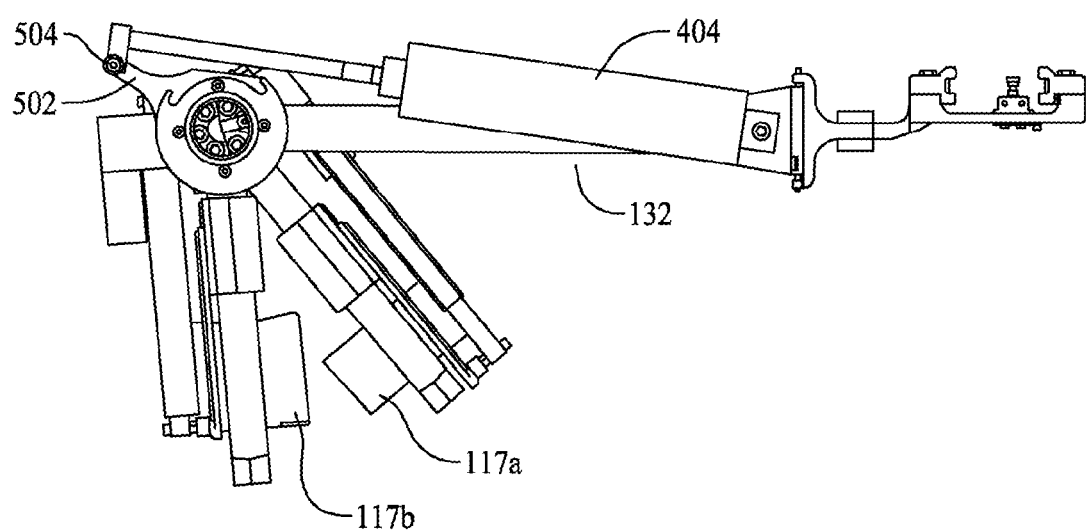
FIG. 23 is a top plan view of a second exemplary traction point drive assembly for the machine shown in FIG. 18.

FIG. 23 is a top plan view of another exemplary traction point drive assembly 500 for the machine shown in FIG. 18. The traction point drive assembly 500 is operated by the actuator 404 as discussed above that is directly linked to a rotatably mounted lever 502 at a pivot point 504. The lever 502 is, in turn, rotatable about an axis coincident with the machine drive axis 112 as discussed above. The lever 502 carries the pressing devices 117a and 117b such that by rotating the lever 502 with the actuator 404, the rotational position of the pressing devices 117a and 117b can be rotated to desired start positions for tire mount and de-mount procedures.

Compared to the traction point drive assembly 400 described above, it can be seen that the link 408 and associated components can be eliminated to provide a simpler and more reliable mechanism. The assembly 500 as shown, however, is exemplary only. Other mechanical arrangements of traction point drive assemblies are contemplated with similar effect to produce still further variations in tire changer machines, and additional pressing devices may be provided.

The traction point drive assembly 500 may be controlled in a similar manner to the traction point drive assembly 400 as described above in relation to FIGS. 21 and 22.

The benefits and advantages of the invention are now believed to have been amply illustrated by the exemplary embodiments disclosed.

An embodiment of machine for changing a tire on a wheel rim, has been disclosed, the machine comprising: a base; a drive assembly coupled to the base and defining a drive axis; a clamping mechanism configured to retain the wheel rim to the drive assembly; a plurality of bead pressing devices engageable to a tire associated with the wheel rim, the plurality of bead pressing devices mounted for rotation about a first rotational axis, the first rotational axis being coincident with the drive axis as the wheel rim is rotated thereabout in a tire changing procedure; and a controller operatively connected to the plurality of bead pressing devices and at least one sensor communicating with the controller, wherein the controller is configured to automatically monitor a position of at least one of the plurality of bead pressing devices relative to the drive axis.

Optionally, the machine may further include a drive mechanism positioning the plurality of bead pressing devices to a predetermined rotational position on the tire. A first position sensor may be associated with the at least one of the plurality of bead pressing devices, and may be a rotational position sensor. The controller may be configured to monitor a rate of change of position of the at least one of the plurality of bead pressing devices, as determined by the position sensor.

A second position sensor may also be provided and be associated with the drive assembly. The second position sensor may be a rotational position sensor, and the controller may be configured to detect a deviation between a position of the drive assembly and a position of the at least one of the plurality of bead pressing devices utilizing the first and second position sensors. At least one of the first and second positions sensors is an encoder.

The plurality of bead pressing devices may include a first bead pressing device and a second bead pressing device, the first and second bead pressing devices being automatically positionable in a tire mount mode in first respective locations on the tire, and the first and second pressing devices further being automatically positionable in a tire de-mount mode in second respective locations on the tire, the first respective locations being different from the second respective locations. The drive mechanism may be a traction point drive mechanism.

Another embodiment of a machine for changing a tire on a wheel rim has also been disclosed, the machine comprising: a base; a drive assembly coupled to the base and defining a drive axis; a clamping mechanism configured to retain the wheel rim to the drive assembly; at least one bead pressing device structurally engageable to a tire associated with the wheel rim; a rotational drive mechanism associated with the at least one pressing device; and a position sensor associated with the at least one bead pressing device.

Optionally, the machine may further include a controller, with the position sensor providing a feedback control signal to the controller. The controller is configured to monitor a rate of change of the at least one bead pressing device, as determined by the position sensor. The rotational drive mechanism may be a traction point drive mechanism, and the controller may be configured to adjust the traction point drive mechanism when the monitored rate of change exceeds a predetermined threshold. The controller may be configured to determine a deviation, based on the feedback control signal, between a position of the rotational drive mechanism and a position of the at least one bead pressing device. The controller may be configured to adjust one of the traction point drive mechanism, the drive assembly, and a position of the at least one bead pressing device when a determined deviation exceeds a predetermined threshold.

A method of changing a tire associated with a wheel rim has also been disclosed. The method utilizes a machine having a drive assembly defining a drive axis, a traction point drive mechanism, and a plurality of bead pressing devices engageable with the tire. The method includes: positioning the plurality of bead pressing devices in contact with the tire; rotating the wheel rim about the drive axis; operating the traction point drive mechanism to rotate at least one of the pressing devices in position on a tire; and monitoring a position of the at least one pressing device.

Optionally, the machine includes a controller, and the method further includes determining, with the controller, a rate of change in position of at least one pressing device and comparing the determined rate of change with a predetermined threshold. The method may also include adjusting operation of the traction point drive mechanism when the monitored rate of change exceeds a predetermined threshold. The machine may be operable in a tire mount mode and a tire de-mount mode, with the method further including: accepting an input for operation of the machine in one of the tire mount mode and the tire de-mount mode; and the controller initially positioning the plurality of bead pressing devices at tire mount and de-mount positions on a side wall of the tire, the tire mount and de-mount positions being different from one another.

The machine may further include a position sensor associated with the drive axis and a controller, with the method further including comparing, with the controller, a position of the traction point drive with a position of the drive axis. The method may also include adjusting, with the controller, operation of one of the traction point drive mechanism and the drive axis when a deviation in compared position exceeds a predetermined threshold.

An embodiment of a machine for changing a tire on a wheel rim has also been disclosed. The machine includes: a base; a drive assembly coupled to the base and defining a drive axis; a clamping mechanism configured to retain the wheel rim to the drive assembly; at least one bead pressing device structurally engageable to a tire associated with the wheel rim; a traction point drive mechanism associated with the at least one bead pressing device; and a closed loop control system monitoring an operation of the fraction point drive mechanism.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A machine for changing a tire on a wheel rim, the machine comprising:
   a base;
   a drive assembly coupled to the base and defining a drive axis;
   a clamping mechanism configured to retain the wheel rim to the drive assembly;
   a plurality of bead pressing devices engageable to a tire associated with the wheel rim, the plurality of bead pressing devices mounted for rotation about a first rotational axis, the first rotational axis being coincident with the drive axis as the wheel rim is rotated thereabout in a tire changing procedure; and
   a controller operatively connected to the plurality of bead pressing devices and at least one sensor communicating with the controller, wherein the controller is configured to automatically monitor a position of at least one of the plurality of bead pressing devices relative to the drive axis.

2. The machine of claim 1, further comprising a drive mechanism positioning the plurality of bead pressing devices to a predetermined rotational position on the tire.

3. The machine of claim 2 where the drive mechanism is a traction point drive mechanism.

4. The machine of claim 1, further comprising a first position sensor associated with the at least one of the plurality of bead pressing devices.

5. The machine of claim 4, wherein the first position sensor is a rotational position sensor.

6. The machine of claim 4, wherein the controller is configured to monitor a rate of change of position of the at least one of the plurality of bead pressing devices, as determined by the position sensor.

7. The machine of claim 4, further comprising a second position sensor associated with the drive assembly.

8. The machine of claim 7, wherein the second position sensor is a rotational position sensor.

9. The machine of claim 7, wherein the controller is configured to detect a deviation between a position of the drive assembly and a position of the at least one of the plurality of bead pressing devices utilizing the first and second position sensors.

10. The tire changer machine of claim 7, wherein at least one of the first and second positions sensors is an encoder.

11. The machine of claim 1, wherein the plurality of bead pressing devices comprises a first bead pressing device and a second bead pressing device, the first and second bead pressing devices being automatically positionable in a tire mount mode in first respective locations on the tire, and the first and second pressing devices further being automatically positionable in a tire de-mount mode in second respective locations on the tire, the first respective locations being different from the second respective locations.

12. A machine for changing a tire on a wheel rim, the machine comprising:
    a base;
    a drive assembly coupled to the base and defining a drive axis;
    a clamping mechanism configured to retain the wheel rim to the drive assembly;
    at least one bead pressing device structurally engageable to a tire associated with the wheel rim;
    a rotational drive mechanism associated with the at least one pressing device; and
    a position sensor associated with the at least one bead pressing device.

13. The machine of claim 12, further comprising a controller, the position sensor providing a feedback control signal to the controller.

14. The machine of claim 13, wherein the controller is configured to monitor a rate of change of the at least one bead pressing device, as determined by the position sensor.

15. The machine of claim 13, wherein the rotational drive mechanism is a traction point drive mechanism, and further wherein the controller is configured to adjust the traction point drive mechanism when the monitored rate of change exceeds a predetermined threshold.

16. The machine of claim 13, wherein the controller is configured to determine a deviation, based on the feedback control signal, between a position of the drive assembly and a position of the at least one bead pressing device.

17. The machine of claim 16, wherein the rotational drive mechanism is a traction point drive mechanism, and further wherein the controller is configured to adjust one of the traction point drive mechanism, the drive assembly, and a position of the at least one bead pressing device when a determined deviation exceeds a predetermined threshold.

18. A method of changing a tire associated with a wheel rim, the method utilizing a machine having a drive assembly defining a drive axis, a traction point drive mechanism, and a plurality of bead pressing devices engageable with the tire, the method comprising:
    positioning the plurality of bead pressing devices in contact with the tire;
    rotating the wheel rim about the drive axis;
    operating the traction point drive mechanism to rotate at least one of the pressing devices in position on a tire; and
    monitoring a position of the at least one pressing device.

19. The method of claim 18, the machine including a controller, the method further comprising determining, with the controller, a rate of change in position of at least one pressing device and comparing the determined rate of change with a predetermined threshold.

20. The method of claim 19, further comprising adjusting operation of the traction point drive mechanism when the monitored rate of change exceeds a predetermined threshold.

21. The method of claim 18, wherein the machine includes a controller, and the machine is operable in a tire mount mode and a tire de-mount mode, the method further comprising:
    accepting an input for operation of the machine in one of the tire mount mode and the tire de-mount mode; and
    the controller initially positioning the plurality of bead pressing devices at tire mount and de-mount positions on a side wall of the tire, the tire mount and de-mount positions being different from one another.

22. The method of claim 18, wherein the machine further includes a position sensor associated with the drive axis and a controller, the method further comprising comparing, with the controller, a position of the traction point drive with a position of the drive axis.

23. The method of claim 22, further comprising adjusting, with the controller, operation of one of the traction point drive mechanism and the drive axis when a deviation in compared position exceeds a predetermined threshold.

24. A machine for changing a tire on a wheel rim, the machine comprising:
    a base;
    a drive assembly coupled to the base and defining a drive axis;
    a clamping mechanism configured to retain the wheel rim to the drive assembly;
    at least one bead pressing device structurally engageable to a tire associated with the wheel rim;
    a traction point drive mechanism associated with the at least one bead pressing device; and
    a closed loop control system monitoring an operation of the traction point drive mechanism.

* * * * *